(12) United States Patent
Sabolsky et al.

(10) Patent No.: US 12,077,835 B2
(45) Date of Patent: Sep. 3, 2024

(54) METHODS AND COMPOSITIONS FOR EXTRACTION OF RARE EARTH ELEMENTS FROM COAL ASH

(71) Applicant: West Virginia University, Morgantown, WV (US)

(72) Inventors: Edward M. Sabolsky, Morgantown, WV (US); Gunes A. Yakaboylu, Morgantown, WV (US); Christina Wildfire, Fairmont, WV (US); John W. Zondlo, Albright, WV (US)

(73) Assignee: West Virginia University, Morgantown, WV (US)

( * ) Notice: Subject to any disclaimer, the term of this patent is extended or adjusted under 35 U.S.C. 154(b) by 362 days.

(21) Appl. No.: 17/065,487

(22) Filed: Oct. 7, 2020

(65) Prior Publication Data
US 2021/0102273 A1   Apr. 8, 2021

Related U.S. Application Data

(60) Provisional application No. 62/911,611, filed on Oct. 7, 2019.

(51) Int. Cl.
*C22B 59/00* (2006.01)
*C22B 1/24* (2006.01)
*C22B 7/02* (2006.01)

(52) U.S. Cl.
CPC ............ *C22B 59/00* (2013.01); *C22B 1/2406* (2013.01); *C22B 7/02* (2013.01)

(58) Field of Classification Search
CPC .. C22B 59/00; C22B 1/00; C22B 1/14; C22B 1/24; C22B 1/2406; Y02P 10/20; B22F 2003/026; B01J 19/126; B09B 3/00

(Continued)

(56) References Cited

U.S. PATENT DOCUMENTS

2013/0171047 A1* 7/2013 Burlingame ............ C22B 7/006
                                                     423/85
2019/0153562 A1* 5/2019 Wang .................... C01F 17/271

FOREIGN PATENT DOCUMENTS

| CN | 106048226 A | * | 10/2016 | |
| EP | 1772527 A1 | * | 4/2007 | ............ B30B 9/327 |
| GB | 2267845 A | * | 12/1993 | ............ B01J 19/126 |

OTHER PUBLICATIONS

Reid, Sable; Tam, Jason; Yang, Mingfan; Azimi, Gisele. Technospheric Mining of Rare Earth Elements from Bauxite Residue (Red Mud): Process Optimization, Kinetic Investigation, and Microwave Pretreatment, Nov. 10, 2017, Sci Rep 7, 15252 (Year: 2017).*

(Continued)

*Primary Examiner* — George Wyszomierski
*Assistant Examiner* — Nikolas Takuya Pullen
(74) *Attorney, Agent, or Firm* — Thomas | Horstemeyer, LLP

(57) ABSTRACT

In one aspect, the disclosure relates to a microwave-assisted comminution method for achieving more efficient beneficiation and later hydrometallurgical recovery of rare earth elements and other metals from coal fly ash particles. The method requires only a short processing time, is energy efficient, allows for better process control, and is environmentally advantageous compared to current methods. This abstract is intended as a scanning tool for purposes of searching in the particular art and is not intended to be limiting of the present disclosure.

19 Claims, 18 Drawing Sheets

(58) Field of Classification Search
USPC .................................................. 75/746–773
See application file for complete search history.

(56) References Cited

OTHER PUBLICATIONS

Graphite, Dec. 5, 2008, Mindat (Year: 2008).*
Arpita Bhatt, Sharon Priyadarshini, Aiswarya Acharath Mohanakrishnan, Arash Abri, Melanie Sattler, Sorakrich Techapaphawit, Physical, chemical, and geotechnical properties of coal fly ash: A global review, Case Studies in Construction Materials, Jun. 14, 2019, Elsevier, vol. 11 (Year: 2019).*
Burdock, George A.. (1997). Encyclopedia of Food and Color Additives, 3 Volume Set—Table of Contents. Taylor & Francis. (Year: 1997).*
Carbon Black Safety Data Sheet, Oct. 19, 2017, Aditya Birla (Year: 2017).*
Lorraine F. Francis, Materials Processing, 2016, Academic Press, pp. 343-414, (Year: 2016).*
Industrial Roller Mills, Sep. 21, 2017, Williams (Year: 2017).*
Engineering ToolBox, Classification of Gases. (2005). (Year: 2005).*
Xiangxuan Liu, Zeyang Zhang, Youpeng Wu, Absorption properties of carbon black/silicon carbide microwave absorbers, Nov. 25, 2010, Composites Part B: Engineering, vol. 42, Issue 2, (Year: 2010).*
Singh, Veerendra; Dixit, Prashant; Venugopal, R; Venkatesh, K. Ore Pretreatment Methods for Grinding: Journey and Prospects, Jun. 2018, Mineral Processing and Extractive Metallurgy Review 40(3):1-15 (Year: 2018).*

\* cited by examiner

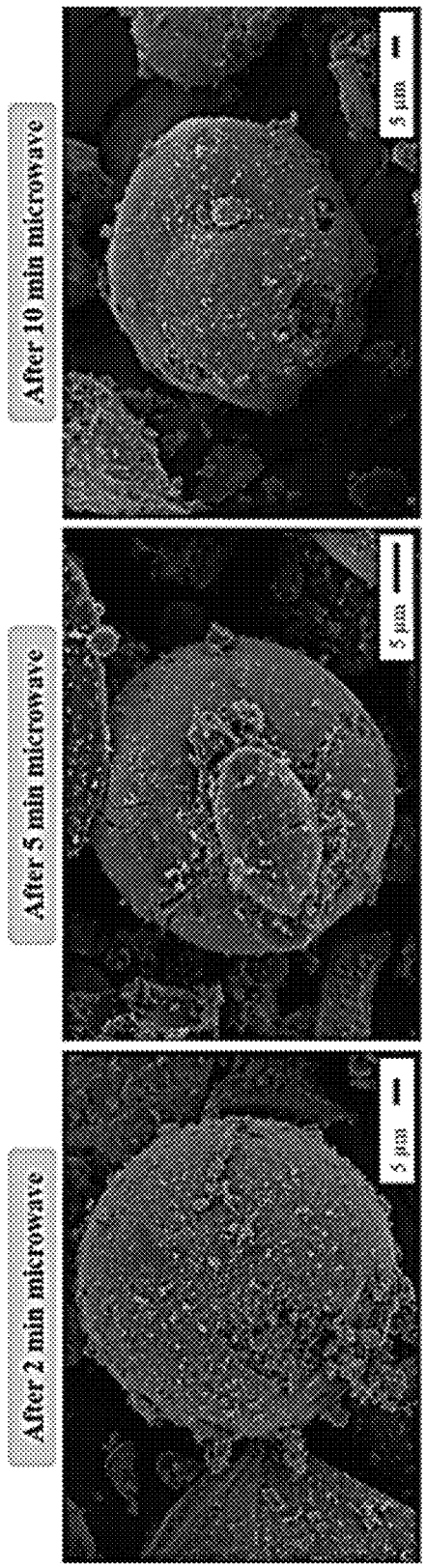
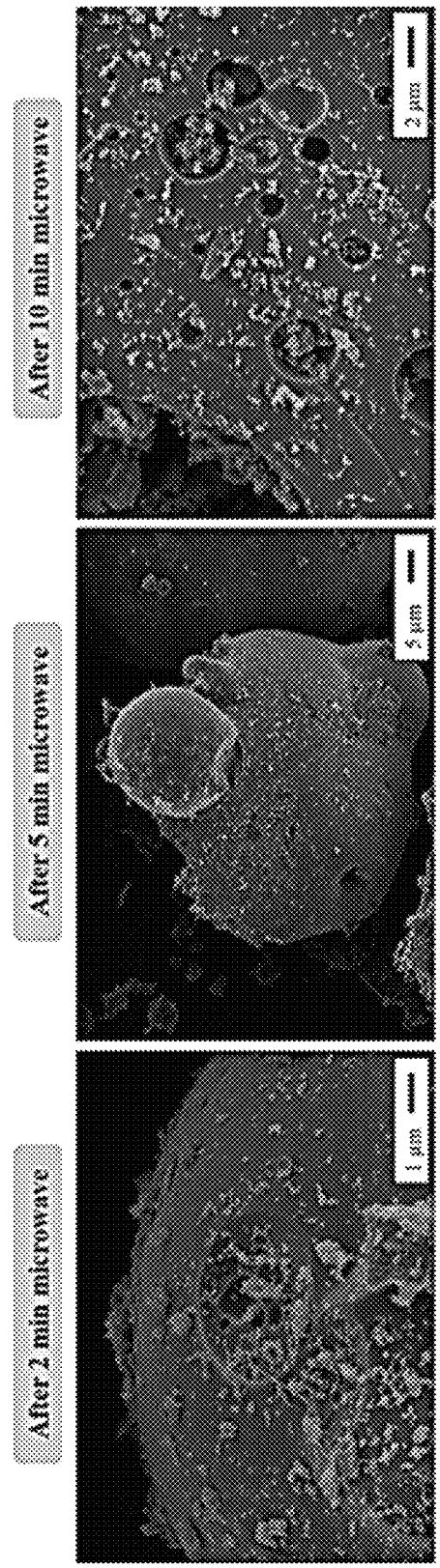
FIG. 6A  FIG. 6B  FIG. 6C
FIG. 6D  FIG. 6E  FIG. 6F

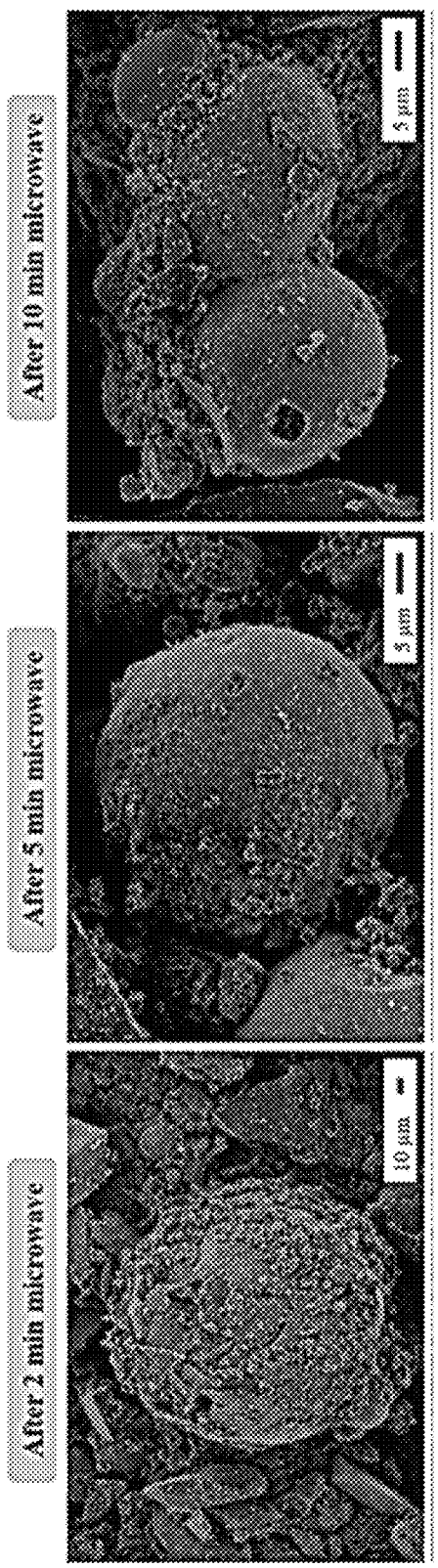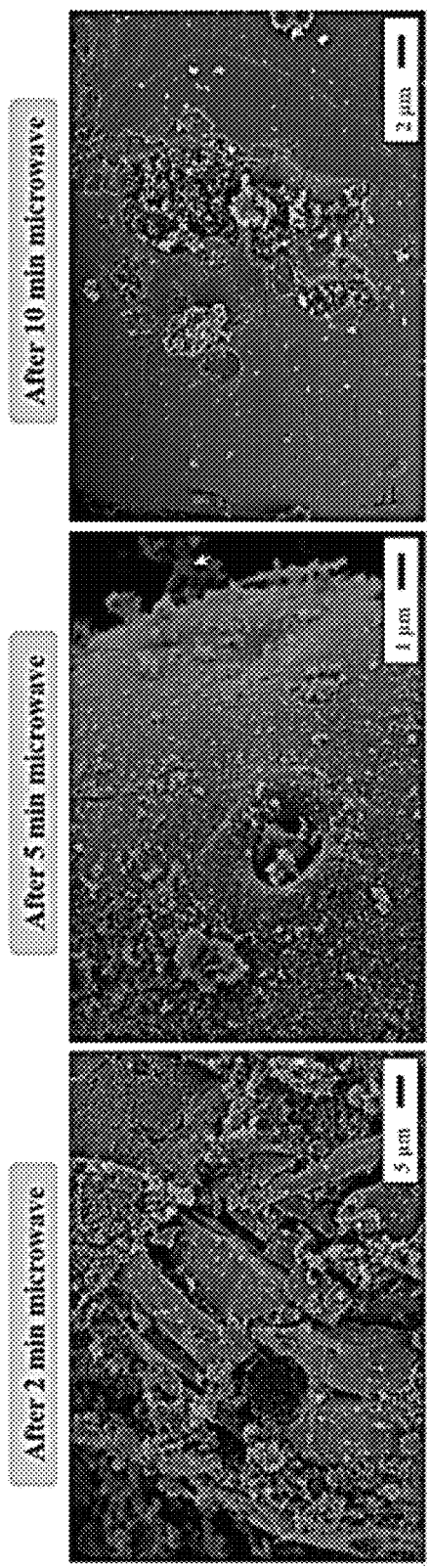

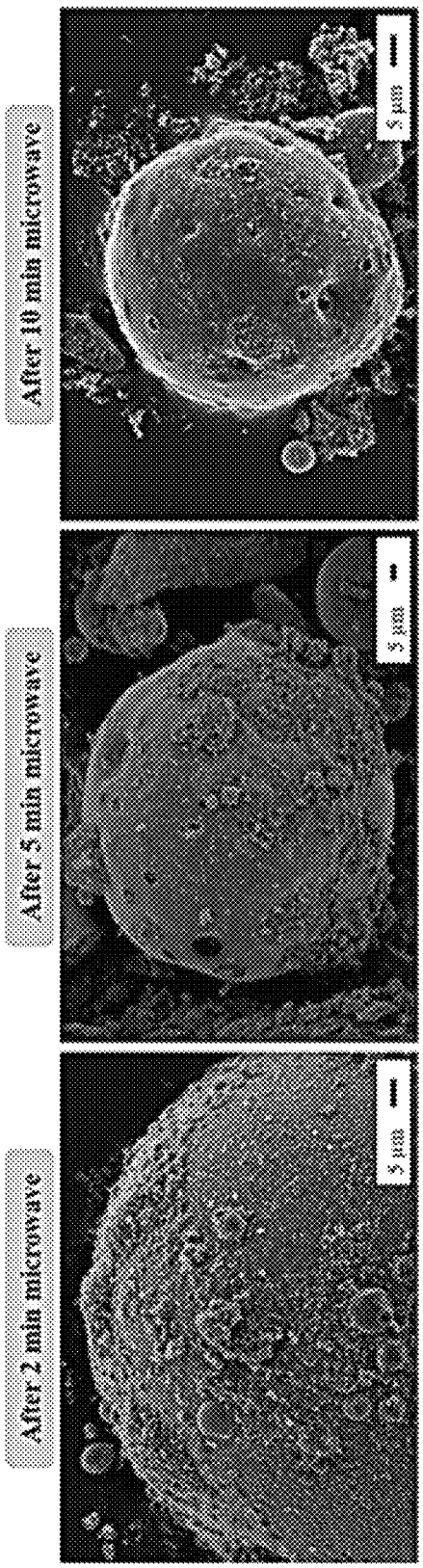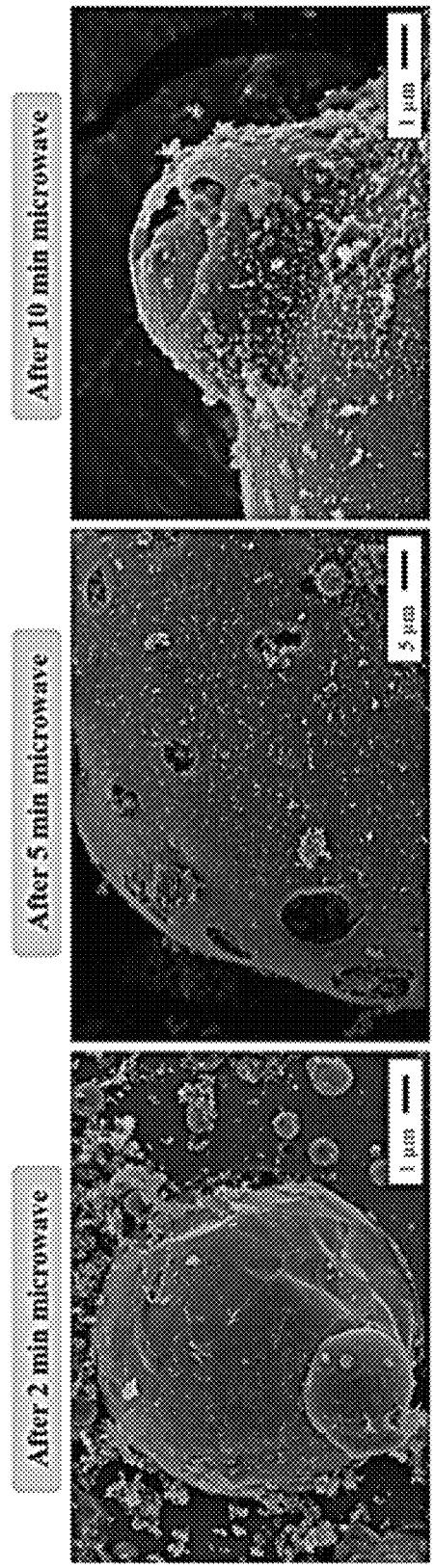

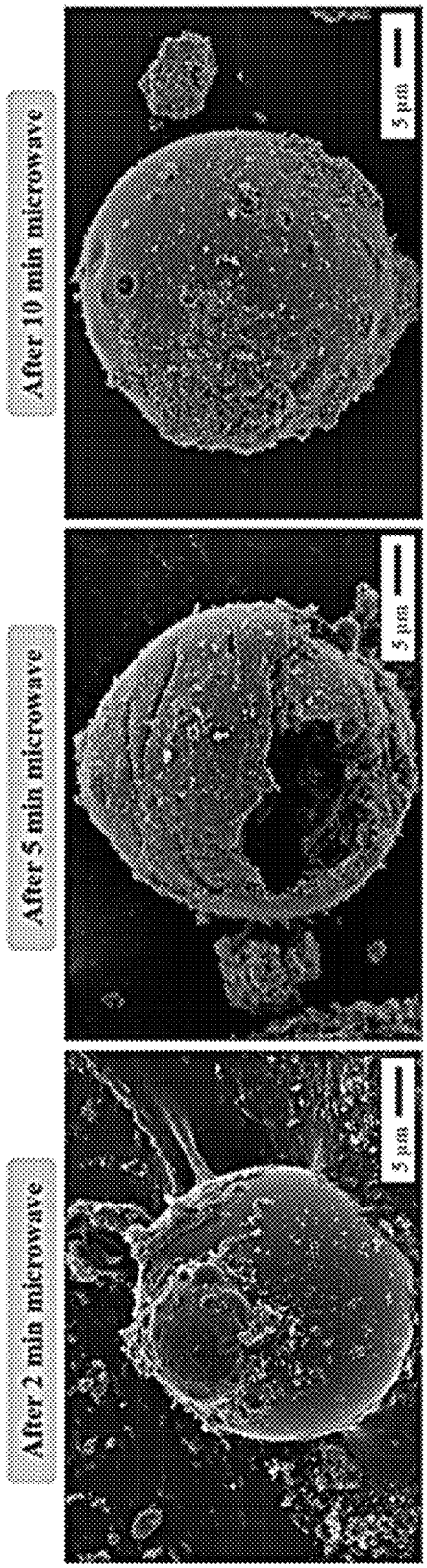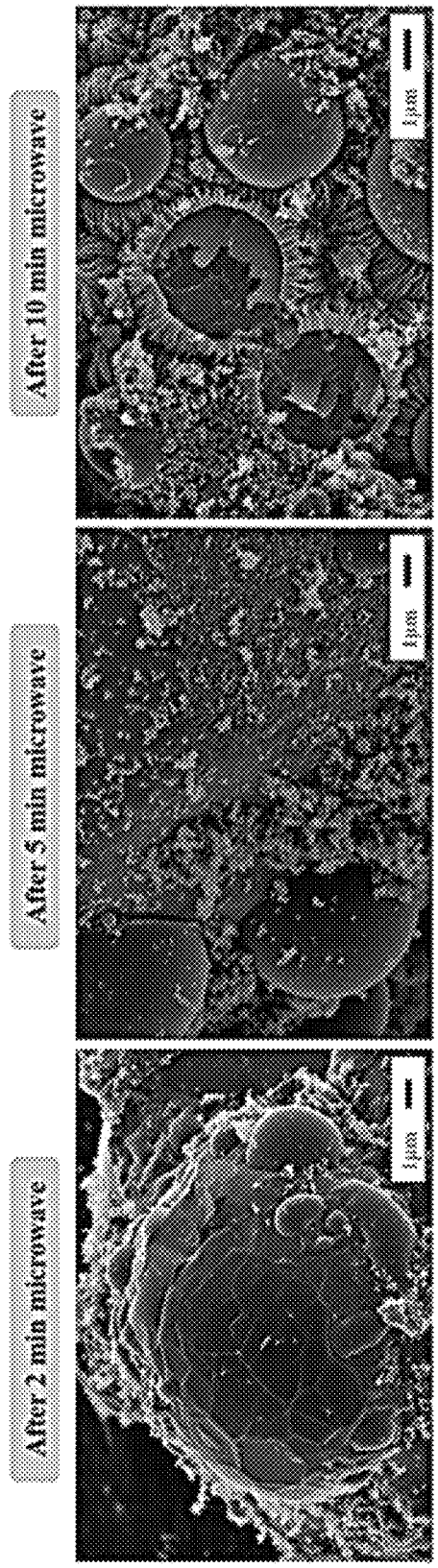

METHODS AND COMPOSITIONS FOR EXTRACTION OF RARE EARTH ELEMENTS FROM COAL ASH

CROSS-REFERENCE TO RELATED APPLICATIONS

This Application claims the benefit of U.S. Provisional Application No. 62/911,611, filed on Oct. 7, 2019, which is incorporated herein by reference in its entirety.

BACKGROUND

Rare earth elements (REEs) are a group of metallic elements including fifteen lanthanides, scandium, and yttrium. REEs have a broad range of applications in electronics, optics, transportation, energy, and defense. Due to their critical use in applications such as permanent magnets, rechargeable batteries, and catalysis, they are essential for low-carbon, clean energy technologies. Demand for REEs is significantly increasing due to the increasing popularity of hybrid and electric vehicles as well as wind turbines.

Over 95% of REEs are found within three minerals: bastnasite, monazite, and xenotime. However, more than 40% of deposits of these minerals are located in China, with smaller fractions in Russia, other members of the Commonwealth of Independent States, Brazil, and Australia. Currently, China controls the production of more than 90% of all REEs. In recent years, China has reduced its export quota for critical REEs by around 40% due to increasing domestic demands. This is expected to adversely affect many industries as well as the development of clean, sustainable technologies in countries outside of China, particularly in the US and European Union. Thus, the United States Department of Energy and the European Commission have designated REEs as a critical group of raw materials with a high supply risk.

An increasing need exists to find alternative sources for recovery and supply of REEs. Coal ash (CA) (both coal fly ash (CFA) and coal bottom ash (CBA)) is abundant in coal-burning countries (e.g., the US, Germany, Poland) as a byproduct or waste product of the coal combustion process in thermal power plants. Annual worldwide production of CA is around 750 million metric tons but is expected to reach 1 billion tons by the year 2020. CA is used in limited amounts in bulk applications such as, for example, concrete production, but increased production of CA has overwhelmed usage and disposal capabilities. Since CA can contains some REEs (with concentrations ranging from 150 to 1300 ppm), it has the potential to be an important source of REEs for industrial use. CA additionally contains large amounts of silica ($SiO_2$), alumina ($Al_2O_3$), iron oxide ($Fe_2O_3$), and other transition metals as well as alkali metals and alkaline earth metals. This general CA composition results in significant formation of spherical aluminosilicate glass particles when cooled during fluidization from 1200° C., and this form of CA is usually termed as coal fly ash (CFA). The REEs are dispersed and entrapped within the glass structure, especially within CFA particles. This aluminosilicate glass phase is highly resistant to aggressive acid solutions and various leaching processes, which makes the extraction of REEs from CFA very difficult.

Thus far, studies involving the extraction of REEs and metals from CA have focused on the hydrometallurgical recovery stage using acid or base leaching, solvent extraction, roasting, selective crystallization, and/or ion exchange. The majority of these studies have focused on separation and extraction of metals (e.g., Al, Fe, Ni) from the CA without serious attention to REEs that may also be present. In part, this is due to the knowledge that REEs are entrapped or isolated in the aluminosilicate phase of the CA, making them difficult to extract. Limited studies have evaluated the use of aggressive acid solutions and roasting additives for leaching and extraction of coal ash particles and CA. For example, $HNO_3$ solutions with concentrations greater than 3-6 M are typically needed for achieving high levels of leaching recovery of REEs from coal ash particles. Without any pre-treatment prior to hydrometallurgical processes, less than 40-50% recovery of REEs is typically obtained even with aggressive acid leaching agents. Furthermore, use of highly concentrated acids such as nitric acid, hydrochloric acid, sulfuric acid, and hydrofluoric acid, is neither practical nor economical for industrial applications due to acid-based corrosion and cost. Moreover, leaching processes using highly concentrated acids present environmental hazards such as, for example, the release of sulfide oxide gases, fluorine, and the like.

Thus far, enhancing the kinetics and efficiency of concentrating and separating REEs at the beneficiation stage in order to improve recovery during hydrometallurgical processes, has not been developed. Typically, various pyrometallurgical processing methods are used for the beneficiation of various composite minerals and ores to concentrate specific elements of interest, mostly metals. Pyrometallurgy focuses on the use of high temperatures to extract and separate the metals. One of the most well-known pyrometallurgical processes is smelting, which uses temperatures higher than 1300° C. for forming a slag and reduced metal liquid, and phase separation is achieved by density difference. This process is energy intensive, making lower temperature methods more attractive. These low-to-intermediate temperature treatments are referred to as roasting, which is typically completed at temperatures of less than 1000° C. in the presence of additional salts or reductive additives such as sodium peroxide, calcium sulfate, sodium carbonate, and the like. The objective of roasting protocols is to engineer desired phase transformations and property changes in order to achieve more efficient physical or magnetic separation of the selected phases or elements. These methods have the advantage of operating at lower temperatures compared to smelting, but their focus is typically the extraction of metal elements other than REEs. Although in some instances, roasting leads to an improved recovery of REEs, its requirements for additional reagents and moderately high temperature processing inhibits the use of such protocols.

It would thus be desirable to develop an alternative approach for improving the enrichment and later extraction of REEs from CA. It would be desirable if this approach focused on the pre-treatment or beneficiation stage of CA processing. If would further be desirable if this alternative approach had lower processing costs and lower energy requirements and presented fewer environmental hazards when compared to traditional approaches to REE or other metal extraction from CA. These needs and other needs are satisfied by the present disclosure.

SUMMARY

In accordance with the purpose(s) of the present disclosure, as embodied and broadly described herein, the disclosure, in one aspect, relates to a microwave-assisted comminution method for achieving more efficient beneficiation and later hydrometallurgical recovery of rare earth elements and other metals from coal fly ash particles. The method requires only a short processing time, is energy efficient, allows for better process control, and is environmentally advantageous compared to current methods.

Disclosed herein are methods for beneficiating coal ash particles, the method comprising: (a) providing coal ash particles; (b) providing a carbon source; (c) mixing the coal ash particles and carbon source to create a first mixture; (d) transferring the first mixture to a heating vessel; (e) placing the heating vessel in a microwave cavity; and (f) microwave processing the first mixture to generate processed coal fly ash particles; wherein the method creates defects in the processed coal ash particles.

Also disclosed herein are methods for hydrometallurgical recovery of rare earth elements from coal ash particles, the method comprising performing an acid leaching step on the processed coal ash particles of any disclosed method for beneficiating coal ash particles.

Also disclosed are compositions comprising rare earth elements produced by any disclosed method for beneficiating coal ash particles and/or any disclosed method for hydrometallurgical recovery of rare earth elements from coal ash particles.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A shows a representative example of process depicting sample preparation and the microwave pretreatment process disclosed herein. FIG. 1B shows a generalized representative process depicting sample preparation and the microwave pretreatment process disclosed herein using coal ash (CA) powder, but can be similarly applied to coal fly ash (CFA) or coal bottom ash (CBA).

FIG. 2A shows concentrations of light rare earth elements (LREEs) in a representative CFA powder. FIG. 2B shows concentrations of heavy rare earth elements (HREEs) in a representative CFA powder. FIG. 2C shows concentrations of certain other metals in a representative CFA powder.

FIG. 3A shows an SEM microstructures of starting CFA powder at a first magnification associated the scalar bar shown in the lower right of the image. FIG. 3B shows an SEM microstructures of starting CFA powder at a second magnification associated the scalar bar shown in the lower right of the image. FIG. 3C shows an SEM microstructures of starting CFA powder at a first magnification associated the scalar bar shown in the lower right of the image. FIG. 3D shows EDS data obtained from a representative starting CFA powder in a first area of the sample. FIG. 3E shows EDS data obtained from a representative starting CFA powder in a second area of the sample. FIG. 3F shows EDS data obtained from a representative starting CFA powder in a third area of the sample.

FIG. 4A shows a representative temperature-time profiles recorded for coal fly ash (CFA)-carbon mixtures as a pellet during microwave heating at 2 kW for 2 min under argon flow. FIG. 4B shows a representative temperature-time profiles recorded for coal fly ash (CFA)-carbon mixtures as a pellet during microwave heating at 2 kW for 5 min under argon flow. FIG. 4C shows a representative temperature-time profiles recorded for coal fly ash (CFA)-carbon mixtures as a pellet during microwave heating at 2 kW for 10 min under argon flow. FIG. 4D shows a representative temperature-time profiles recorded for coal fly ash (CFA)-carbon mixtures as a loose powder during microwave heating at 2 kW for 2 min under argon flow. FIG. 4E shows a representative temperature-time profiles recorded for coal fly ash (CFA)-carbon mixtures as a loose powder during microwave heating at 2 kW for 5 min under argon flow. FIG. 4F shows a representative temperature-time profiles recorded for coal fly ash (CFA)-carbon mixtures as a loose powder during microwave heating at 2 kW for 10 min under argon flow.

FIG. 5A shows representative XRD pattern data obtained from microwave-treated CFA-carbon pellet samples prepared at a 95-5 vol % pellet mixture, respectively, compared to a representative untreated CFA sample. FIG. 5B shows representative XRD pattern data obtained from microwave-treated CFA-carbon pellet samples prepared at a 90-10 vol % pellet mixture (vol % for CFA-carbon material, respectively), respectively, compared to a representative untreated CFA sample. FIG. 5C shows representative XRD pattern data obtained from microwave-treated CFA-carbon pellet samples prepared at a 80-20 vol % pellet mixture (vol % for CFA-carbon material, respectively), respectively, compared to a representative untreated CFA sample. FIG. 5D shows representative XRD pattern data obtained from microwave-treated CFA-carbon pellet samples prepared at a 70-30 vol % pellet mixture (vol % for CFA-carbon material, respectively), respectively, compared to a representative untreated CFA sample.

FIGS. 6A-6L show representative SEM images of microstructures. FIG. 6A shows a representative SEM image obtained from a 95-5 vol % pellet (vol % for CFA-carbon material, respectively) after 2 min microwave heating (scalar bar is shown in the lower right of the image). FIG. 6B shows a representative SEM image obtained from a 95-5 vol % pellet (vol % for CFA-carbon material, respectively) after 5 min microwave heating (scalar bar is shown in the lower right of the image). FIG. 6C shows a representative SEM image obtained from a 95-5 vol % pellet (vol % for CFA-carbon material, respectively) after 10 min microwave heating (scalar bar is shown in the lower right of the image). FIG. 6D shows a representative SEM image obtained from a 95-5 vol % pellet (vol % for CFA-carbon material, respectively) after 2 min microwave heating (scalar bar is shown in the lower right of the image). FIG. 6E shows a representative SEM image obtained from a 95-5 vol % pellet (vol % for CFA-carbon material, respectively) after 5 min microwave heating (scalar bar is shown in the lower right of the image). FIG. 6F shows a representative SEM image obtained from a 95-5 vol % pellet (vol % for CFA-carbon material, respectively) after 10 min microwave heating (scalar bar is shown in the lower right of the image). FIG. 6G shows a representative SEM image obtained from a 90-10 vol % pellet (vol % for CFA-carbon material, respectively) after 2 min microwave heating (scalar bar is shown in the lower right of the image). FIG. 6H shows a representative SEM image obtained from a 90-10 vol % pellet (vol % for CFA-carbon material, respectively) after 5 min microwave heating (scalar bar is shown in the lower right of the image). FIG. 6I shows a representative SEM image obtained from a 90-10 vol % pellet (vol % for CFA-carbon material, respectively) after 10 min microwave heating (scalar bar is shown in the lower right of the image). FIG. 6J shows a representative SEM image obtained from a 90-10 vol % pellet (vol % for CFA-carbon material, respectively) after 2 min microwave heating (scalar bar is shown in the lower right of the image). FIG. 6K shows a representative SEM image obtained from a 90-10 vol % pellet (vol % for CFA-carbon material, respectively) after 5 min microwave heating (scalar bar is shown in the lower right of the image). FIG. 6L shows a representative SEM image obtained from a 90-10 vol % pellet (vol % for CFA-carbon material, respectively) after 10 min microwave heating (scalar bar is shown in the lower right of the image).

FIGS. 7A-7L show representative SEM images of microstructures. FIG. 7A shows a representative SEM image obtained from a 80-20 vol % pellet (vol % for CFA-carbon material, respectively) after 2 min microwave heating (scalar bar is shown in the lower right of the image). FIG. 7B shows a representative SEM image obtained from a 80-20 vol % pellet (vol % for CFA-carbon material, respectively) after 5 min microwave heating (scalar bar is shown in the lower right of the image). FIG. 7C shows a representative SEM image obtained from a 80-20 vol % pellet (vol % for CFA-carbon material, respectively) after 10 min microwave heating (scalar bar is shown in the lower right of the image). FIG. 7D shows a representative SEM image obtained from a 80-20 vol % pellet after 2 min microwave heating (scalar bar is shown in the lower right of the image). FIG. 7E shows a representative SEM image obtained from a 80-20 vol % pellet (vol % for CFA-carbon material, respectively) after 5 min microwave heating (scalar bar is shown in the lower right of the image). FIG. 7F shows a representative SEM image obtained from a 80-20 vol % pellet (vol % for CFA-carbon material, respectively) after 10 min microwave heating (scalar bar is shown in the lower right of the image). FIG. 7G shows a representative SEM image obtained from a 70-30 vol % pellet (vol % for CFA-carbon material, respectively) after 2 min microwave heating (scalar bar is shown in the lower right of the image). FIG. 7H shows a representative SEM image obtained from a 70-30 vol % pellet (vol % for CFA-carbon material, respectively) after 5 min microwave heating (scalar bar is shown in the lower right of the image). FIG. 7I shows a representative SEM image obtained from a 70-30 vol % pellet after 10 min microwave heating (scalar bar is shown in the lower right of the image). FIG. 7J shows a representative SEM image obtained from a 70-30 vol % pellet (vol % for CFA-carbon material, respectively) after 2 min microwave heating (scalar bar is shown in the lower right of the image). FIG. 7K shows a representative SEM image obtained from a 70-30 vol % pellet (vol % for CFA-carbon material, respectively) after 5 min microwave heating (scalar bar is shown in the lower right of the image). FIG. 7L shows a representative SEM image obtained from a 70-30 vol % pellet (vol % for CFA-carbon material, respectively) after 10 min microwave heating (scalar bar is shown in the lower right of the image).

FIG. 8A shows representative leaching efficiency data for total rare earth elements (TREEs) from microwave-treated pellets. FIG. 8B shows representative leaching efficiency data for certain REEs (Nd, Y, Dy, Eu, Tb) from microwave-treated pellets. FIG. 8C shows representative leaching efficiency data for certain REEs (Ce, La) from microwave-treated pellets.

Figure 1A:
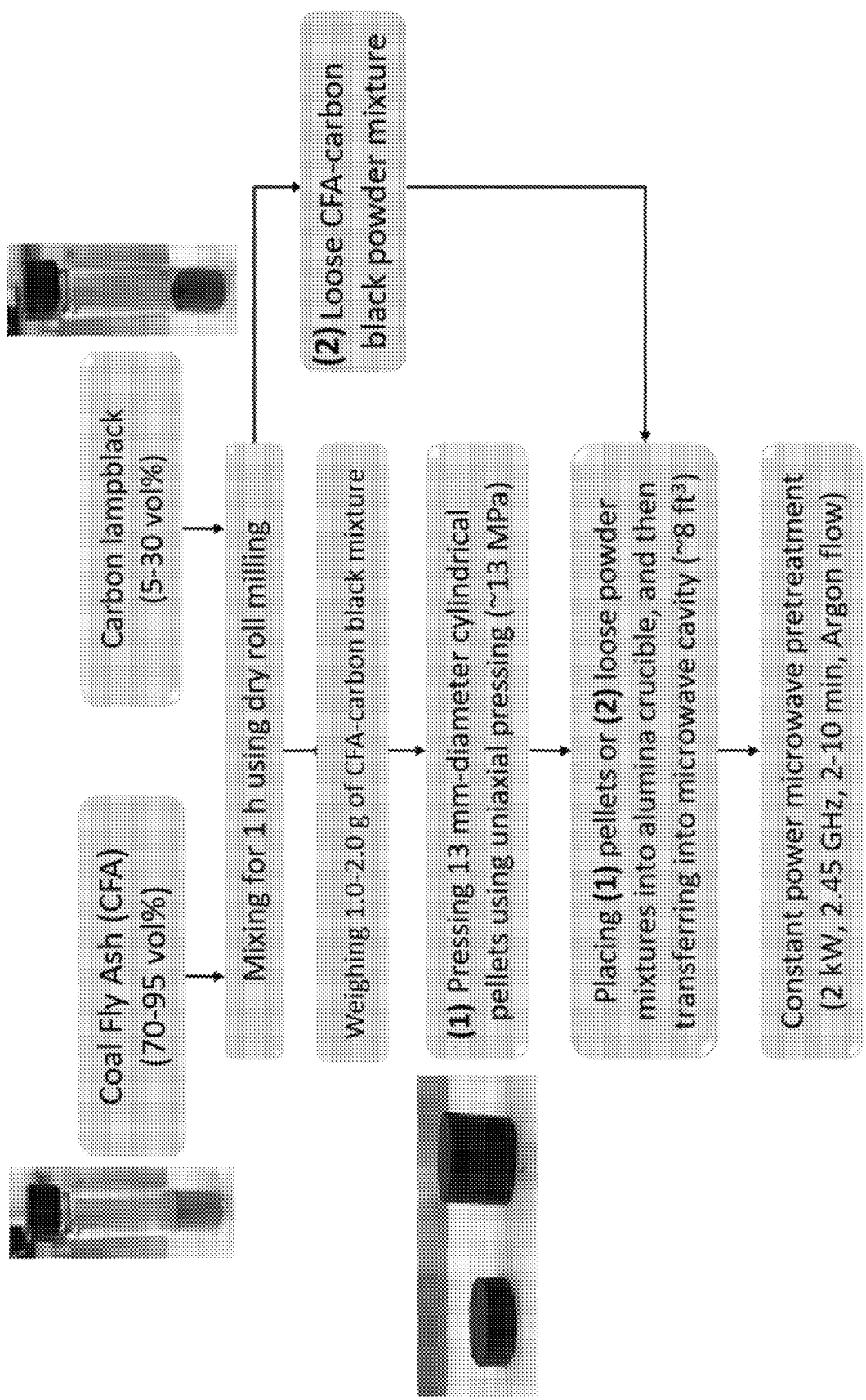
FIGS. 1A-1B show representative process flowcharts of methods according to the present disclosure.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a rare earth element," "a metal," or "an acid," includes, but is not limited to, mixtures of two or more such rare earth elements, metals, or acids, and the like.

As used herein, a "rare earth element" (sometimes abbreviated REE) is a metal selected from the fourteen lanthanides, scandium, and yttrium in the periodic table. REEs include cerium (Ce), dysprosium (Dy), erbium (Er), Europium (Eu), Gadolinium (Gd), holmium (Ho), lanthanum (La), lutetium (Lu), neodymium (Nd), praseodymium (Pr), samarium (Sm), scandium (Sc), terbium (Tb), thulium (Tm), ytterbium (Yb), and yttrium (Y). Although generally common in Earth's crust, REEs are often dispersed and their ore deposits are not common. REEs are commercially important, having applications in electronics, permanent magnets and batteries for electric vehicles, aerospace industry, superconductors, lasers, catalysis, lamps, medical imaging, dyes and paints including luminous dyes and paints, fuel cells, phosphors, additives to stainless steel, glass additives, and more.

"Coal ash" (abbreviated CA herein) is any residual material that remains after partial or complete combustion of coal, e.g., combustion in power plant, boiler, furnace or incinerator, including, but not limited to a such residual material that remains after partial or complete combustion of coal in a coal-fired power plant. Coal ash contains numerous elements including some health hazards such as, for example, mercury, arsenic, and lead, and is responsible for the second largest source of industrial waste in the United States, with over 130 million tons produced per year. Coal ash is particulate residue that can be classified based on their collection or disposal sites, including coal fly ash, bottom fly ash, hopper ash, cyclone ash, and more.

"Coal fly ash" (abbreviated CFA herein and sometimes also referred to as "fly ash") is the lighter portion of coal ash particles that floats into exhaust stacks along with flue gases in coal-fired power plants. CFA can be captured by electrostatic or particle filters prior to reaching power plant chimneys. CFA composition can vary depending on the composition of the coal being burned but can include silica, alumina, and sometimes calcium oxide, with minor constituents of other metals including iron, nickel, and numerous REEs in small concentrations.

"Coal bottom ash" (abbreviated CBA herein and sometimes also referred to as "bottom ash") is the heavier portion of coal ash particles that remains after partial or complete combustion of coal. It is particulate material that is dark gray, granular, porous, and is predominantly sand size. CBA settles to the bottom of the combustion chamber and can be collected in a hopper. It can be removed by means of high-pressure water jets and conveyed by sluiceways either to a disposal pond or to a decant basin for dewatering, crushing, and stockpiling for disposal or further processing and use. CBA composition can vary depending on the composition of the coal being burned but can include silica, alumina, and sometimes calcium oxide, with minor constituents of other metals including iron, nickel, and numerous REEs in small concentrations.

"Beneficiation" is a general term for a process that improves the economic value of a material, usually with specific applications relating to mining or the extraction of metals from ores and/or mineral deposits. In one aspect, disclosed herein is a beneficiation process for CA that results in easier extraction of REEs.

As used herein, "comminution" is a term for a process that reduces solid materials from a larger average particle size to a smaller average particle size. Comminution can be a mechanical process such as crushing or grinding, or can be accomplished by other means. In one aspect, disclosed herein is a microwave-assisted comminution process that generates structural and chemical defects in CA products. In a further aspect, the comminution process disclosed herein is used in the beneficiation stage of CA processing.

"Sintering" as used herein is the process of forming a solid mass of material by a means such as heat and/or pressure without prior melting. In one aspect, sintering is undesirable in the processes disclosed herein. In another aspect, the processes disclosed herein are optimized to avoid sintering of CA materials.

"Hydrometallurgy" is a method for obtaining metals from their ores, whereas "hydrometallurgical recovery" applies the techniques of hydrometallurgy to other materials such as, for example, electronic waste or, in the present disclosure, CA. Leaching techniques, such as, for example, acid leaching, are commonly used in hydrometallurgical recovery. In one aspect, provided herein are techniques and methods for pre-treatment of CA in order to improve the efficiency of hydrometallurgical recovery of REEs and other metals.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a carbon compound refers to an amount that is sufficient to achieve the desired improvement in the property modulated by the formulation component, e.g. achieving the desired level of modulus. The specific level in terms of wt % in a composition required as an effective amount will depend upon a variety of factors including the amount and type of carbon compound (e.g., carbon black), amount and structure of coal ash particles or coal fly ash.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Microwave-Assisted Beneficiation Method

In one aspect, the processing of ores and/or minerals generally consists of two steps: beneficiation and hydrometallurgical recovery. In a further aspect, for coal ash (CA) particles, beneficiation has traditionally focused on increasing the relative concentrations of rare earth elements (REEs) for later extraction or recovery by hydrometallurgical processes such as, for example, solvent extraction, acid leaching, or base leaching. In one aspect, acid leaching can be carried out using hydrochloric acid, nitric acid, sulfuric acid, other strong acids, and combinations thereof. However, in some aspects, the efficiency of leaching processes and subsequent recovery of REEs are dependent upon the diffusion rates of acid solutions into the aluminosilicate glass particles that make up majority of CA particles. Currently, the efficiency of acid leaching processes is highly limited and inefficient for extraction of REEs from CA particles sources, since a majority of the REE content of CA particles is distributed and isolated within these particles. In one aspect, the present disclosure provides an effective pre-treatment process for improving the kinetics and efficiency of concentrating and separating REEs from CA particles during later hydrometallurgical recovery. In another aspect, CA particles and related materials encompass a broad range of particle sizes, and the methods disclosed herein can be used on CA particles of any size, or CA particles and/or related materials encompassing numerous different particles sizes and/or particle size distributions in the same sample.

In a further aspect, disclosed herein is a microwave-assisted comminution process for achieving more efficient beneficiation as well as improved leaching kinetics and recovery of REEs from CA particles. In one aspect, microwave heating is versatile, efficient, and directly interacts with a microwave-absorbing material, as opposed to radiant or conductive heating, which depend on absorption of electromagnetic energy. In a further aspect, the microwave energy absorbed by the samples disclosed herein is primarily dependent upon electronic interaction, which is proportional to frequency, dielectric permittivity, and dielectric loss tangent of the samples. In one aspect, the main constituents of CA particles ($SiO_2$ and $Al_2O_3$) do not possess sufficient loss factors to allow dielectric heating and are thus transparent to microwaves at the frequency of 2.45 GHz.

In a further aspect, the present disclosure provides for various carbon sources to be mixed with CA particles prior to microwave-assisted comminution. In one aspect, the carbon sources can be carbon black, carbon lampblack, activated carbon, carbon acetylene black (50% compressed, 90% compressed, or 100% compressed), charcoal, coal, similar materials, and mixtures thereof. In one aspect, the carbon source is not required to be 100% pure carbon in order for the disclosed methods to function as described. However, without wishing to be bound by theory, higher purity carbon sources may result in better microwave coupling and more complete processing of CA particles and other CA particles materials. In a further aspect, different carbon sources may possess different microwave coupling properties but these properties still lie within the disclosed ranges. In another aspect, different carbon sources can be mixed together to fine tune the microwave coupling properties. In some aspects, mixtures of different carbon sources may result in cost savings. In one aspect, the carbon sources are inexpensive. Further in this aspect, the carbon sources are significantly less costly than similar amounts of roasting additives. In a further aspect, these carbon-based materials are good microwave absorbers and can be easily heated by microwave radiation. In one aspect, materials with a combination of a moderate or high dielectric constant and high dielectric loss tangent provide optimum microwave energy coupling and rapidly convert microwave energy into thermal energy. In a further aspect, the carbon sources disclosed herein possess both of these properties. Without wishing to be bound by theory, in one aspect, heating mixtures of carbon sources and CA particles creates a three-dimensional network between the CA particles and carbon, thereby providing a rapid transfer of thermal energy from carbon to CA particles. In a still further aspect, this method can cause rapid local heating and drastic temperature changes on the surface of the CA particles, thereby leading to the formation of pores and microcracks. In some aspects, the CA particles can be spherical. In one aspect, these pores and microcracks can enhance diffusion rates of acid solutions into the aluminosilicate CA particles, and thus enhance acid interaction with REEs during hydrometallurgical recovery. In another aspect, this improvement in diffusion may enable the use of lower concentrations of acid solutions during hydrometallurgical recovery, further reducing processing costs and environmental hazards.

Figure 1B:
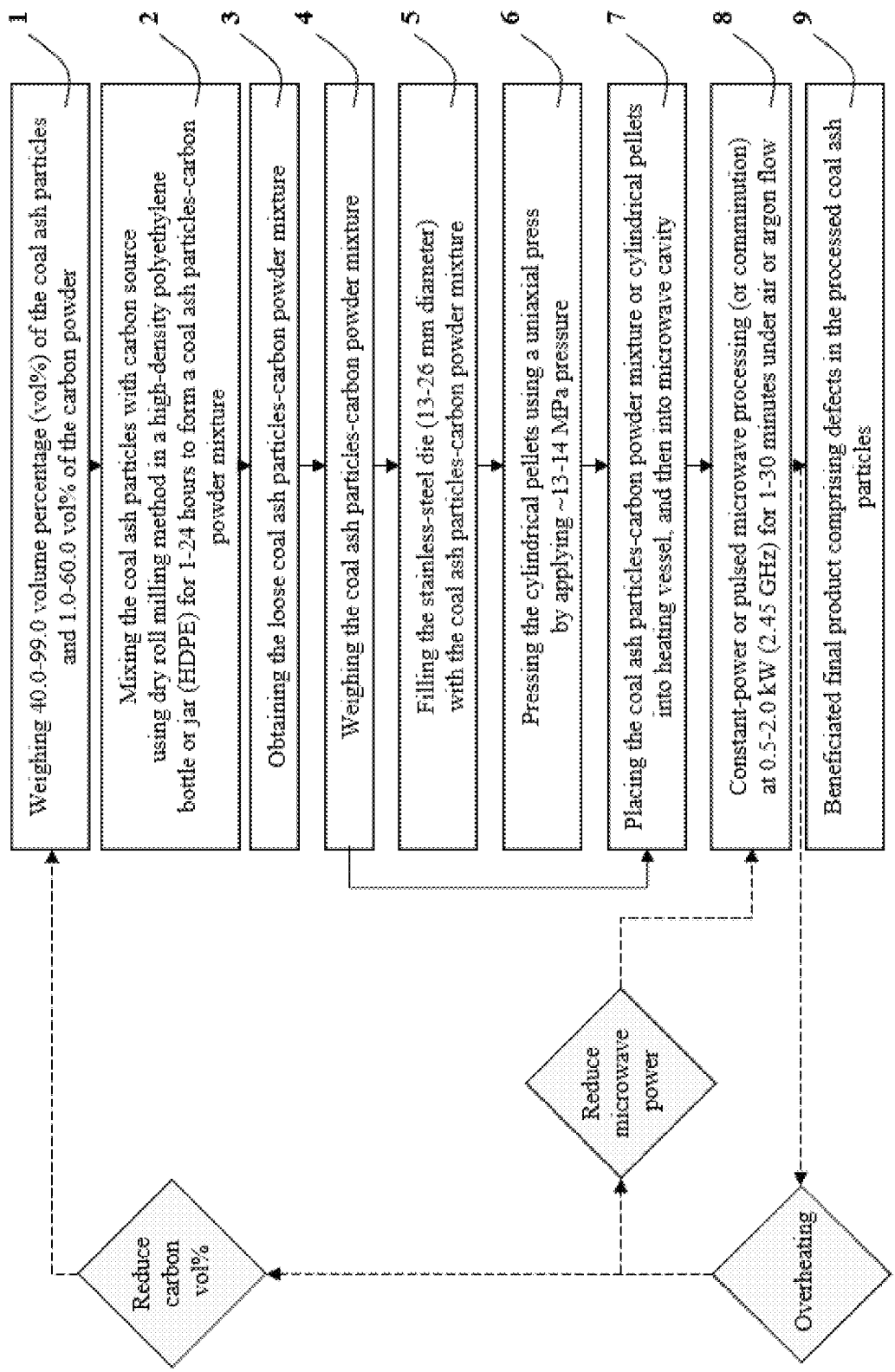

In one aspect, FIG. 1B shows an example method as disclosed herein for the specific aspect of utilizing coal fly ash. However, the method can also be applied to coal ash particles of varying compositions, e.g., coal ash particles comprising CFA and CBA, the method including the following steps:

(a) Desired amounts of CA particles and carbon powders weighed separately.
(b) Weighed CA particles and carbon powders are transferred into a container made of high-density polyethylene (HDPE), sealed, and dry roll milled.
(c) Homogeneous CA-carbon powder mixtures are removed from the HDPE container.
(d) Desired amount of homogeneous powder is weighed in a weighing boat.
(e) Optionally, a stainless steel die is filled with the weighed powder.
(f) Optionally, following step (e), a uniaxial press is used to apply pressure to the weighed powder to form cylindrical pellets.
(g) Loose powders (if steps (e) and (f) are skipped) or cylindrical pellets (if steps (e) and (f) are performed) are placed into a heating vessel, e.g., an alumina crucible, which is in turn placed into a microwave cavity.
(h) Constant power or pulsed microwave processing is performed on the loose powders or cylindrical pellets is performed at different power levels at 2.45 GHz.
(i) Remove the beneficiated final product from the microwave cavity.

Further in this aspect, in step (a), the CA particles can be used at volume percentages ranging from about 1 to about 99 vol %, or about 5, 10, 15, 20, 25, 30, 35, 40, 45, 50, 55, 60, 65, 70, 75, 80, 85, 90, 95, or 99 vol %, or a combination of any of the foregoing values, or a range encompassing any of the foregoing values. In various further aspects, the CA particles can be used at 70, 80, 90, or 95 vol %. In a still further aspect, the CA particles can be used at volume percentages ranging from about 30 to about 70 vol %. In a yet further aspect, the CA particles can be used at volume percentages ranging from about 25 to about 75 vol %. In an even further aspect, the CA particles can be used at volume percentages ranging from about 20 to about 80 vol %. In a still further aspect, the CA particles can be used at volume percentages ranging from about 15 to about 85 vol %. In a yet further aspect, the CA particles can be used at volume percentages ranging from about 10 to about 90 vol %. In an even further aspect, the CA particles can be used at volume percentages ranging from about 5 to about 95 vol %. In a still further aspect, the CA particles can be used at volume percentages ranging from about 70 to about 99 vol %. In a yet further aspect, the CA particles can be used at volume percentages ranging from about 75 to about 99 vol %. In an even further aspect, the CA particles can be used at volume percentages ranging from about 80 to about 99 vol %. In a still further aspect, the CA particles can be used at volume percentages ranging from about 85 to about 99 vol %. In a still further aspect, the CA particles can be used at volume percentages ranging from about 70 to about 95 vol %. In a yet further aspect, the CA particles can be used at volume percentages ranging from about 75 to about 95 vol %. In an even further aspect, the CA particles can be used at volume percentages ranging from about 80 to about 95 vol %. In a still further aspect, the CA particles can be used at volume percentages ranging from about 85 to about 95 vol %. In a still further aspect, the CA particles can be used at volume percentages ranging from about 90 to about 95 vol %. In a still further aspect, the CA particles can be used at volume percentages ranging from about 70 to about 90 vol %. In a yet further aspect, the CA particles can be used at volume percentages ranging from about 75 to about 90 vol %. In an even further aspect, the CA particles can be used at volume percentages ranging from about 80 to about 90 vol %. In a still further aspect, the CA particles can be used at volume percentages ranging from about 85 to about 90 vol %. In a still further aspect, the CA particles can be used at volume percentages ranging from about 70 to about 85 vol %. In a yet further aspect, the CA particles can be used at volume percentages ranging from about 75 to about 85 vol %. In an even further aspect, the CA particles can be used at volume percentages ranging from about 80 to about 85 vol %. In a still further aspect, the CA particles can be used at volume percentages ranging from about 70 to about 80 vol %. In a yet further aspect, the CA particles can be used at volume percentages ranging from about 75 to about 80 vol %. In a still further aspect, the CA particles can be used at volume percentages ranging from about 70 to about 75 vol %.

Further in this aspect, in step (a), the carbon sources can be used at volume percentages ranging that represent the vol % balance to achieve 100 vol % based on the vol % of CA particles used. In a further aspect, the carbon sources can be used from about 1 to about 60 vol %, or about 1, 5, 10, 15, 20, 25, 30, 35, 40, 45, 50, 55, 60, 65, 70, 75, 80, 85, 90, 95, or 99 vol % or a combination of any of the foregoing values, or a range encompassing any of the foregoing values. In various further aspects, the carbon sources are used at 5, 10, 20, or 30 vol %. In a still further aspect, the carbon sources can be used at volume percentages ranging from about 1 to about 30 vol %. In a yet further aspect, the CA particles can be used at volume percentages ranging from about 1 to about 25 vol %. In an even further aspect, the CA particles can be used at volume percentages ranging from about 1 to about 20 vol %. In a still further aspect, the CA particles can be used at volume percentages ranging from about 1 to about 15 vol %. In a yet further aspect, the CA particles can be used at volume percentages ranging from about 1 to about 10 vol %. In an even further aspect, the CA particles can be used at volume percentages ranging from about 1 to about 5 vol %. In a still further aspect, the CA particles can be used at volume percentages ranging from about 1 to about 4.99 vol %. In a still further aspect, the carbon sources can be used at volume percentages ranging from about 5 to about 30 vol %. In a yet further aspect, the CA particles can be used at volume percentages ranging from about 5 to about 25 vol %. In an even further aspect, the CA particles can be used at volume percentages ranging from about 5 to about 20 vol %. In a still further aspect, the CA particles can be used at volume percentages ranging from about 5 to about 15 vol %. In a yet further aspect, the CA particles can be used at volume percentages ranging from about 5 to about 10 vol %. In a still further aspect, the carbon sources can be used at volume percentages ranging from about 10 to about 30 vol %. In a yet further aspect, the CA particles can be used at volume percentages ranging from about 10 to about 25 vol %. In an even further aspect, the CA particles can be used at volume percentages ranging from about 10 to about 20 vol %. In a still further aspect, the CA particles can be used at volume percentages ranging from about 10 to about 15 vol %. In a still further aspect, the carbon sources can be used at volume percentages ranging from about 15 to about 30 vol %. In a yet further aspect, the CA particles can be used at volume percentages ranging from about 15 to about 25 vol %. In an even further aspect, the CA particles can be used at volume percentages ranging from about 15 to about 20 vol %. Without wishing to be bound by theory, a certain volume percentage of carbon source is required to obtain sufficient contact area between the carbon and CA particles. In some aspects, samples using a carbon content at the lower end of the disclosed ranges may be less expensive and/or simpler to prepare.

In one aspect, when high carbon content (e.g., above 10 vol %) is used, sample temperature can reach 1200-1300° C. or higher. Further in this aspect, reaching a temperature this high can result in the formation of final CA particles having a high density or even sintered form. In one aspect, a high density or sintered form is undesirable from a standpoint of later extracting REEs and other metals. Thus, in one aspect, balance between microwave power application and carbon content and distribution should be carefully controlled in order to maximize efficient carbothermal reduction of the CA particles to produce the desired microstructural defects on and within CA particles. In one aspect, during microwave irradiation, various parameters must be controlled in order to control local reduction of CA particles as well as further CO gas and possible solid carbon transport into the defects formed in the CA particles. In one aspect, transport of CO and carbon into the interior of a CA particles particle will lead to further reduction of the transition metals and rare earths within the CA particles, resulting in an increase in dissolution and separation of all metals later during hydrometallurgical recovery.

In one aspect, different carbon sources have different inorganic impurities and chemistries. In a further aspect, these impurities and chemistries partially determine the rates of microwave energy coupling and thus the efficiencies of the microwave-assisted comminution methods at the beneficiation stage of the disclosed method. In a still further aspect, the volume percentages of the carbon sources as well as processing parameters (see step (h)) are selected based on the microwave coupling properties of the various carbon sources.

In another aspect, in step (b), roll milling time is any time sufficient to obtain a homogeneous CA particles-carbon loose powder mixture, or is from about 1 to about 24 hours, or is 1, 2, 3, 4, 5, 6, 7, 8, 9, 10, 11, 12, 13, 14, 15, 16, 17, 18, 19, 20, 21, 22, 23, or about 24 hours, or a combination of any of the foregoing values, or a range encompassing any of the foregoing values. Further in this aspect, obtaining a homogeneous carbon-CA particles facilitates creation of the three-dimensional network between CA particles and carbon as well as rapid transfer of thermal energy from the carbon particles as microwave absorbers to CA particles during microwave pretreatment. In a further aspect, mixing time of the CA particles and carbon source is optimized for achieving repeatable results with respect to composition of the CA particles-carbon mixtures. Further in this aspect, this mixing is critical to obtaining similar microwave time and temperature profiles and beneficiated final products. In one aspect, the percolation and distribution of carbon within the CA particles-carbon mixtures results in different microwave coupling including different heating mechanisms and profiles. Thus, in one aspect, depending upon the microstructural variations in the CA particles-carbon mixtures, two composite compositions with the same volume content may heat differently and thus react to microwave treatment differently, thus leading to later differences in REE extraction. Thus, in any of the above aspects, mixing is critical to ensure homogeneity of CA particles-carbon mixtures and reproducibility of results.

In still another aspect, in step (e), the stainless steel die is from 13-26 mm in diameter, or is 13, 14, 15, 16, 17, 18, 19, 20, 21, 22, 23, 24, 25, or 26 mm in diameter, or a combination of any of the foregoing values, or a range encompassing any of the foregoing values. In some aspects, steel dies smaller than 13 mm in diameter or larger than 26 mm in diameter can be used to generate smaller or larger pellets, respectively. Further in this aspect, the smaller or larger pellets can be successfully employed in the disclosed methods.

In one aspect, in step (f), about 13 to about 14 MPa of pressure is applied to the weighed powder, or about 13. 13.1, 13.2, 13.3, 13.4, 13.5, 13.6, 13.7, 13.8, 13.9, or about 14

MPa of pressure is applied, or a combination of any of the foregoing values, or a range encompassing any of the foregoing values. In a further aspect, the pellets thus formed are cylindrical with diameters ranging from 13-26 mm, or about 13, 14, 15, 16, 17, 18, 19, 20, 21, 22, 23, 24, 25, or 26 mm, or a combination of any of the foregoing values, or a range encompassing any of the foregoing values. In some aspects, the pellet diameter can be less than 13 mm or larger than 26 mm, depending on the size of the die used for pressing the pellet. In one aspect, the diameter of the pellets matches the diameter of the stainless steel die used to press the pellet. In a further aspect, the thickness of the pellet depends on the powder composition used to make the pellet. In one aspect, the pellet is from about 5 to about 20 mm thick, or is 5, 6, 7, 8, 9, 10, 11, 12, 13, 14, 15, 16, 17, 18, 19, or about 20 mm thick, or a combination of any of the foregoing values, or a range encompassing any of the foregoing values. In one aspect, the act of pressing leads to a further increase in the contact area between the CA particles and carbon particles. In one aspect, pellets of different diameters can also be used. In any of the above aspects, the size of the steel die used and thus the size of the pellet generated can affect pressing parameters. In one aspect, for example, pressing a larger diameter, thicker pellet may require more pressure to be applied. Without wishing to be bound by theory, processing larger amounts of material (i.e., higher weights of loose powder mixtures or larger diameter and/or thicker pellets) at once leads to improved processing times and lower costs.

Further in this aspect, an aerosol lubricant such as, for example, zinc stearate, can be applied to the stainless steel die prior to filling the die with a CA particles-carbon powder mixture. In one aspect, presence of the lubricant lowers the friction in the die during uniaxial pressing of the pellets. In another aspect, presence of the lubricant makes the release of the pressed pellets easier and prevents damage such as spallation or cracking of the pellets.

In one aspect, in step (g), if CA particles-carbon loose powder mixtures are used, the powder should be weighed directly in the heating vessel, e.g., an alumina crucible, after the roll milling process and then transferred into the microwave cavity. Further in this aspect, performing this step eliminates segregation between CA particles and carbon particles prior to microwave processing. Still further in this aspect, performing this step increases the efficiency of microwave-assisted comminution.

In one aspect, the microwave unit used for steps (g) and (h) has a large cavity, is sealed to eliminate microwave leakage, and is tested using a microwave leakage detector prior to operation of the microwave unit. In one aspect, in step (h), the power level is from about 0.5 to about 2.0 kW, or is 0.5, 1, 1.5 or about 2 kW, or a combination of any of the foregoing values, or a range encompassing any of the foregoing values. In a further aspect, the microwave power can be selected by a skilled artisan based on the volume percentage of the CA particles and carbon materials in the loose powder mixtures or cylindrical pellets. In a further aspect, step (h) is carried out for a period of time from about 1 to about 30 minutes, or for about 1, 2, 5, 10, 15, 20, 25, or about 30 minutes, or a combination of any of the foregoing values, or a range encompassing any of the foregoing values. In one aspect, carbon content and microwave power level are selected to reach the desired temperature during the microwave-assisted comminution process disclosed herein. Further in this aspect, these two parameters are selected in tandem. Still further in this aspect, correct selection of these two parameters allows for the avoidance of uncontrolled processing and/or overheating.

In a still further aspect, the microwave processing can be carried out under an inert gas or under ambient air flow. In a further aspect, the inert gas can be argon, nitrogen, helium, or a combination thereof, or a combination of any of the foregoing inert gases in any proportion with ambient air. In one aspect, microwave processing is carried out under argon. In yet another aspect, the volumetric flow rate of the air or argon is from about 5 to about 100 standard cubic centimeters per minute (sccm) or is about 5, 10, 15, 20, 25, 30, 35, 40, 45, 50, 55, 60, 65, 70, 75, 80, 85, 90, 95, or about 100 sccm, or a combination of any of the foregoing values, or a range encompassing any of the foregoing values. In one aspect, the volumetric flow rate of the air or argon is from about 20 to about 50 sccm.

In one aspect, if the loose powder mixture or cylindrical pellet overheats following microwave processing, experimental parameters can be adjusted to achieve successful comminution. In one aspect, in the case of overheating, a new mixture can be prepared wherein the vol % of carbon is reduced relative to the amount of CA particles. In an alternative aspect, a new mixture can be prepared wherein the vol % of the carbon and of the CA particles remain the same, but microwave power or processing time is reduced. In one aspect, the skilled artisan will be able to detect overheating based on the occurrence of sintering and/or melting, which in turn results in loss of accessible pores and/or microcracks.

In one aspect, the microwave-assisted method disclosed herein induces rapid, local heating and reduction on the surfaces of the spherical aluminosilicate glass particles due to microwave coupling. Further in this aspect, defective structures such as pores and microcracks are formed in the CA particles, thus leading to improvements in the diffusion rates of acid solutions into the CA particles as well as improvements in interactions of acid with REEs during hydrometallurgical recovery.

In one aspect, the processing of ores and/or minerals generally consists of two steps: beneficiation and hydrometallurgical recovery. In a further aspect, for coal fly ash (CFA) particles, beneficiation has traditionally focused on increasing the relative concentrations of rare earth elements (REEs) for later extraction or recovery by hydrometallurgical processes such as, for example, solvent extraction, acid leaching, or base leaching. In one aspect, acid leaching can be carried out using hydrochloric acid, nitric acid, sulfuric acid, other strong acids, and combinations thereof. However, in some aspects, the efficiency of leaching processes and subsequent recovery of REEs are dependent upon the diffusion rates of acid solutions into the aluminosilicate glass particles that make up majority of CFA particles. Currently, the efficiency of acid leaching processes is highly limited and inefficient for extraction of REEs from CFA particles sources, since a majority of the REE content of CFA particles is distributed and isolated within these particles. In one aspect, the present disclosure provides an effective pre-treatment process for improving the kinetics and efficiency of concentrating and separating REEs from CFA particles during later hydrometallurgical recovery. In another aspect, CFA particles and related materials encompass a broad range of particle sizes, and the methods disclosed herein can be used on CFA particles of any size, or CFA particles and/or related materials encompassing numerous different particles sizes and/or particle size distributions in the same sample.

In a further aspect, disclosed herein is a microwave-assisted comminution process for achieving more efficient beneficiation as well as improved leaching kinetics and recovery of REEs from CFA particles. In one aspect, microwave heating is versatile, efficient, and directly interacts with a microwave-absorbing material, as opposed to radiant or conductive heating, which depend on absorption of electromagnetic energy. In a further aspect, the microwave energy absorbed by the samples disclosed herein is primarily dependent upon electronic interaction, which is proportional to frequency, dielectric permittivity, and dielectric loss tangent of the samples. In one aspect, the main constituents of CFA particles ($SiO_2$ and $Al_2O_3$) do not possess sufficient loss factors to allow dielectric heating and are thus transparent to microwaves at the frequency of 2.45 GHz.

In a further aspect, the present disclosure provides for various carbon sources to be mixed with CFA particles prior to microwave-assisted comminution. In one aspect, the carbon sources can be carbon black, carbon lampblack, activated carbon, carbon acetylene black (50% compressed, 90% compressed, or 100% compressed), charcoal, coal, similar materials, and mixtures thereof. In one aspect, the carbon source is not required to be 100% pure carbon in order for the disclosed methods to function as described. However, without wishing to be bound by theory, higher purity carbon sources may result in better microwave coupling and more complete processing of CFA particles and other CFA particles materials. In a further aspect, different carbon sources may possess different microwave coupling properties but these properties still lie within the disclosed ranges. In another aspect, different carbon sources can be mixed together to fine tune the microwave coupling properties. In some aspects, mixtures of different carbon sources may result in cost savings. In one aspect, the carbon sources are inexpensive. Further in this aspect, the carbon sources are significantly less costly than similar amounts of roasting additives. In a further aspect, these carbon-based materials are good microwave absorbers and can be easily heated by microwave radiation. In one aspect, materials with a combination of a moderate or high dielectric constant and high dielectric loss tangent provide optimum microwave energy coupling and rapidly convert microwave energy into thermal energy. In a further aspect, the carbon sources disclosed herein possess both of these properties. Without wishing to be bound by theory, in one aspect, heating mixtures of carbon sources and CFA particles creates a three-dimensional network between the CFA particles and carbon, thereby providing a rapid transfer of thermal energy from carbon to CFA particles. In a still further aspect, this method can cause rapid local heating and drastic temperature changes on the surface of the CFA particles, thereby leading to the formation of pores and microcracks. In some aspects, the CFA particles can be spherical. In one aspect, these pores and microcracks can enhance diffusion rates of acid solutions into the aluminosilicate CFA particles, and thus enhance acid interaction with REEs during hydrometallurgical recovery. In another aspect, this improvement in diffusion may enable the use of lower concentrations of acid solutions during hydrometallurgical recovery, further reducing processing costs and environmental hazards.

In one aspect, FIG. 1B shows an example method as disclosed herein, the method including the following steps:
(a) Desired amounts of CFA particles and carbon powders weighed separately.
(b) Weighed CFA particles and carbon powders are transferred into a container made of high-density polyethylene (HDPE), sealed, and dry roll milled.
(c) Homogeneous CFA-carbon powder mixtures are removed from the HDPE container.
(d) Desired amount of homogeneous powder is weighed in a weighing boat.
(e) Optionally, a stainless steel die is filled with the weighed powder.
(f) Optionally, following step (e), a uniaxial press is used to apply pressure to the weighed powder to form cylindrical pellets.
(g) Loose powders (if steps (e) and (f) are skipped) or cylindrical pellets (if steps (e) and (f) are performed) are placed into a heating vessel, e.g., an alumina crucible, which is in turn placed into a microwave cavity.
(h) Constant power or pulsed microwave processing is performed on the loose powders or cylindrical pellets is performed at different power levels at 2.45 GHz.
(i) Remove the beneficiated final product from the microwave cavity.

Further in this aspect, in step (a), the CFA particles can be used at volume percentages ranging from about 1 to about 99 vol %, or about 5, 10, 15, 20, 25, 30, 35, 40, 45, 50, 55, 60, 65, 70, 75, 80, 85, 90, 95, or 99 vol %, or a combination of any of the foregoing values, or a range encompassing any of the foregoing values. In various further aspects, the CFA particles can be used at 70, 80, 90, or 95 vol %. In a still further aspect, the CFA particles can be used at volume percentages ranging from about 30 to about 70 vol %. In a yet further aspect, the CFA particles can be used at volume percentages ranging from about 25 to about 75 vol %. In an even further aspect, the CFA particles can be used at volume percentages ranging from about 20 to about 80 vol %. In a still further aspect, the CFA particles can be used at volume percentages ranging from about 15 to about 85 vol %. In a yet further aspect, the CFA particles can be used at volume percentages ranging from about 10 to about 90 vol %. In an even further aspect, the CFA particles can be used at volume percentages ranging from about 5 to about 95 vol %. In a still further aspect, the CFA particles can be used at volume percentages ranging from about 70 to about 99 vol %. In a yet further aspect, the CFA particles can be used at volume percentages ranging from about 75 to about 99 vol %. In an even further aspect, the CFA particles can be used at volume percentages ranging from about 80 to about 99 vol %. In a still further aspect, the CFA particles can be used at volume percentages ranging from about 85 to about 99 vol %. In a still further aspect, the CFA particles can be used at volume percentages ranging from about 70 to about 95 vol %. In a yet further aspect, the CFA particles can be used at volume percentages ranging from about 75 to about 95 vol %. In an even further aspect, the CFA particles can be used at volume percentages ranging from about 80 to about 95 vol %. In a still further aspect, the CFA particles can be used at volume percentages ranging from about 85 to about 95 vol %. In a still further aspect, the CFA particles can be used at volume percentages ranging from about 90 to about 95 vol %. In a still further aspect, the CFA particles can be used at volume percentages ranging from about 70 to about 90 vol %. In a yet further aspect, the CFA particles can be used at volume percentages ranging from about 75 to about 90 vol %. In an even further aspect, the CFA particles can be used at volume percentages ranging from about 80 to about 90 vol %. In a still further aspect, the CFA particles can be used at volume percentages ranging from about 85 to about 90 vol %. In a still further aspect, the CFA particles can be used at volume percentages ranging from about 70 to about 85 vol %. In a yet further aspect, the CFA particles can be used at volume percentages ranging from about 75 to about 85 vol %. In an even further aspect, the CFA particles can be used at volume percentages ranging from about 80 to about 85 vol %. In a still further aspect, the CFA particles can be used at volume percentages ranging from about 70 to about 80 vol %. In a yet further aspect, the CFA particles can be used at volume percentages ranging from about 75 to about 80 vol %. In a still further aspect, the CFA particles can be used at volume percentages ranging from about 70 to about 75 vol %.

Further in this aspect, in step (a), the carbon sources can be used at volume percentages ranging that represent the vol % balance to achieve 100 vol % based on the vol % of CFA particles used. In a further aspect, the carbon sources can be used from about 1 to about 60 vol %, or about 1, 5, 10, 15, 20, 25, 30, 35, 40, 45, 50, 55, 60, 65, 70, 75, 80, 85, 90, 95, or 99 vol % or a combination of any of the foregoing values, or a range encompassing any of the foregoing values. In various further aspects, the carbon sources are used at 5, 10, 20, or 30 vol %. In a still further aspect, the carbon sources can be used at volume percentages ranging from about 1 to about 30 vol %. In a yet further aspect, the CFA particles can be used at volume percentages ranging from about 1 to about 25 vol %. In an even further aspect, the CFA particles can be used at volume percentages ranging from about 1 to about 20 vol %. In a still further aspect, the CFA particles can be used at volume percentages ranging from about 1 to about 15 vol %. In a yet further aspect, the CFA particles can be used at volume percentages ranging from about 1 to about 10 vol %. In an even further aspect, the CFA particles can be used at volume percentages ranging from about 1 to about 5 vol %. In a still further aspect, the CFA particles can be used at volume percentages ranging from about 1 to about 4.99 vol %. In a still further aspect, the carbon sources can be used at volume percentages ranging from about 5 to about 30 vol %. In a yet further aspect, the CFA particles can be used at volume percentages ranging from about 5 to about 25 vol %. In an even further aspect, the CFA particles can be used at volume percentages ranging from about 5 to about 20 vol %. In a still further aspect, the CFA particles can be used at volume percentages ranging from about 5 to about 15 vol %. In a yet further aspect, the CFA particles can be used at volume percentages ranging from about 5 to about 10 vol %. In a still further aspect, the carbon sources can be used at volume percentages ranging from about 10 to about 30 vol %. In a yet further aspect, the CFA particles can be used at volume percentages ranging from about 10 to about 25 vol %. In an even further aspect, the CFA particles can be used at volume percentages ranging from about 10 to about 20 vol %. In a still further aspect, the CFA particles can be used at volume percentages ranging from about 10 to about 15 vol %. In a still further aspect, the carbon sources can be used at volume percentages ranging from about 15 to about 30 vol %. In a yet further aspect, the CFA particles can be used at volume percentages ranging from about 15 to about 25 vol %. In an even further aspect, the CFA particles can be used at volume percentages ranging from about 15 to about 20 vol %. Without wishing to be bound by theory, a certain volume percentage of carbon source is required to obtain sufficient contact area between the carbon and CFA particles. In some aspects, samples using a carbon content at the lower end of the disclosed ranges may be less expensive and/or simpler to prepare.

In one aspect, when high carbon content (e.g., above 10 vol %) is used, sample temperature can reach 1200-1300° C. or higher. Further in this aspect, reaching a temperature this high can result in the formation of final CFA particles having a high density or even sintered form. In one aspect, a high density or sintered form is undesirable from a standpoint of later extracting REEs and other metals. Thus, in one aspect, balance between microwave power application and carbon content and distribution should be carefully controlled in order to maximize efficient carbothermal reduction of the CFA particles to produce the desired microstructural defects on and within CFA particles. In one aspect, during microwave irradiation, various parameters must be controlled in order to control local reduction of CFA particles as well as further CO gas and possible solid carbon transport into the defects formed in the CFA particles. In one aspect, transport of CO and carbon into the interior of a CFA particles particle will lead to further reduction of the transition metals and rare earths within the CFA particles, resulting in an increase in dissolution and separation of all metals later during hydrometallurgical recovery.

In one aspect, different carbon sources have different inorganic impurities and chemistries. In a further aspect, these impurities and chemistries partially determine the rates of microwave energy coupling and thus the efficiencies of the microwave-assisted comminution methods at the beneficiation stage of the disclosed method. In a still further aspect, the volume percentages of the carbon sources as well as processing parameters (see step (h)) are selected based on the microwave coupling properties of the various carbon sources.

In another aspect, in step (b), roll milling time is any time sufficient to obtain a homogeneous CFA particles-carbon loose powder mixture, or is from about 1 to about 24 hours, or is 1, 2, 3, 4, 5, 6, 7, 8, 9, 10, 11, 12, 13, 14, 15, 16, 17, 18, 19, 20, 21, 22, 23, or about 24 hours, or a combination of any of the foregoing values, or a range encompassing any of the foregoing values. Further in this aspect, obtaining a homogeneous carbon-CFA particles facilitates creation of the three-dimensional network between CFA particles and carbon as well as rapid transfer of thermal energy from the carbon particles as microwave absorbers to CFA particles during microwave pretreatment. In a further aspect, mixing time of the CFA particles and carbon source is optimized for achieving repeatable results with respect to composition of the CFA particles-carbon mixtures. Further in this aspect, this mixing is critical to obtaining similar microwave time and temperature profiles and beneficiated final products. In one aspect, the percolation and distribution of carbon within the CFA particles-carbon mixtures results in different microwave coupling including different heating mechanisms and profiles. Thus, in one aspect, depending upon the microstructural variations in the CFA particles-carbon mixtures, two composite compositions with the same volume content may heat differently and thus react to microwave treatment differently, thus leading to later differences in REE extraction. Thus, in any of the above aspects, mixing is critical to ensure homogeneity of CFA particles-carbon mixtures and reproducibility of results.

In still another aspect, in step (e), the stainless steel die is from 13-26 mm in diameter, or is 13, 14, 15, 16, 17, 18, 19, 20, 21, 22, 23, 24, 25, or 26 mm in diameter, or a combination of any of the foregoing values, or a range encompassing any of the foregoing values. In some aspects, steel dies smaller than 13 mm in diameter or larger than 26 mm in diameter can be used to generate smaller or larger pellets, respectively. Further in this aspect, the smaller or larger pellets can be successfully employed in the disclosed methods.

In one aspect, in step (f), about 13 to about 14 MPa of pressure is applied to the weighed powder, or about 13. 13.1, 13.2, 13.3, 13.4, 13.5, 13.6, 13.7, 13.8, 13.9, or about 14

MPa of pressure is applied, or a combination of any of the foregoing values, or a range encompassing any of the foregoing values. In a further aspect, the pellets thus formed are cylindrical with diameters ranging from 13-26 mm, or about 13, 14, 15, 16, 17, 18, 19, 20, 21, 22, 23, 24, 25, or 26 mm, or a combination of any of the foregoing values, or a range encompassing any of the foregoing values. In some aspects, the pellet diameter can be less than 13 mm or larger than 26 mm, depending on the size of the die used for pressing the pellet. In one aspect, the diameter of the pellets matches the diameter of the stainless steel die used to press the pellet. In a further aspect, the thickness of the pellet depends on the powder composition used to make the pellet. In one aspect, the pellet is from about 5 to about 20 mm thick, or is 5, 6, 7, 8, 9, 10, 11, 12, 13, 14, 15, 16, 17, 18, 19, or about 20 mm thick, or a combination of any of the foregoing values, or a range encompassing any of the foregoing values. In one aspect, the act of pressing leads to a further increase in the contact area between the CFA particles and carbon particles. In one aspect, pellets of different diameters can also be used. In any of the above aspects, the size of the steel die used and thus the size of the pellet generated can affect pressing parameters. In one aspect, for example, pressing a larger diameter, thicker pellet may require more pressure to be applied. Without wishing to be bound by theory, processing larger amounts of material (i.e., higher weights of loose powder mixtures or larger diameter and/or thicker pellets) at once leads to improved processing times and lower costs.

Further in this aspect, an aerosol lubricant such as, for example, zinc stearate, can be applied to the stainless steel die prior to filling the die with a CFA particles-carbon powder mixture. In one aspect, presence of the lubricant lowers the friction in the die during uniaxial pressing of the pellets. In another aspect, presence of the lubricant makes the release of the pressed pellets easier and prevents damage such as spallation or cracking of the pellets.

In one aspect, in step (g), if CFA particles-carbon loose powder mixtures are used, the powder should be weighed directly in the heating vessel, e.g., an alumina crucible, after the roll milling process and then transferred into the microwave cavity. Further in this aspect, performing this step eliminates segregation between CFA particles and carbon particles prior to microwave processing. Still further in this aspect, performing this step increases the efficiency of microwave-assisted comminution.

In one aspect, the microwave unit used for steps (g) and (h) has a large cavity, is sealed to eliminate microwave leakage, and is tested using a microwave leakage detector prior to operation of the microwave unit. In one aspect, in step (h), the power level is from about 0.5 to about 2.0 kW, or is 0.5, 1, 1.5 or about 2 kW, or a combination of any of the foregoing values, or a range encompassing any of the foregoing values. In a further aspect, the microwave power can be selected by a skilled artisan based on the volume percentage of the CFA particles and carbon materials in the loose powder mixtures or cylindrical pellets. In a further aspect, step (h) is carried out for a period of time from about 1 to about 30 minutes, or for about 1, 2, 5, 10, 15, 20, 25, or about 30 minutes, or a combination of any of the foregoing values, or a range encompassing any of the foregoing values. In one aspect, carbon content and microwave power level are selected to reach the desired temperature during the microwave-assisted comminution process disclosed herein. Further in this aspect, these two parameters are selected in tandem. Still further in this aspect, correct selection of these two parameters allows for the avoidance of uncontrolled processing and/or overheating.

In a still further aspect, the microwave processing can be carried out under an inert gas or under ambient air flow. In a further aspect, the inert gas can be argon, nitrogen, helium, or a combination thereof, or a combination of any of the foregoing inert gases in any proportion with ambient air. In one aspect, microwave processing is carried out under argon. In yet another aspect, the volumetric flow rate of the air or argon is from about 5 to about 100 standard cubic centimeters per minute (sccm) or is about 5, 10, 15, 20, 25, 30, 35, 40, 45, 50, 55, 60, 65, 70, 75, 80, 85, 90, 95, or about 100 sccm, or a combination of any of the foregoing values, or a range encompassing any of the foregoing values. In one aspect, the volumetric flow rate of the air or argon is from about 20 to about 50 sccm.

In one aspect, if the loose powder mixture or cylindrical pellet overheats following microwave processing, experimental parameters can be adjusted to achieve successful comminution. In one aspect, in the case of overheating, a new mixture can be prepared wherein the vol % of carbon is reduced relative to the amount of CFA particles. In an alternative aspect, a new mixture can be prepared wherein the vol % of the carbon and of the CFA particles remain the same, but microwave power or processing time is reduced. In one aspect, the skilled artisan will be able to detect overheating based on the occurrence of sintering and/or melting, which in turn results in loss of accessible pores and/or microcracks.

In one aspect, the microwave-assisted method disclosed herein induces rapid, local heating and reduction on the surfaces of the spherical aluminosilicate glass particles due to microwave coupling. Further in this aspect, defective structures such as pores and microcracks are formed in the CFA particles, thus leading to improvements in the diffusion rates of acid solutions into the CFA particles as well as improvements in interactions of acid with REEs during hydrometallurgical recovery.

In one aspect, the processing of ores and/or minerals generally consists of two steps: beneficiation and hydrometallurgical recovery. In a further aspect, for coal bottom ash (CBA) particles, beneficiation has traditionally focused on increasing the relative concentrations of rare earth elements (REEs) for later extraction or recovery by hydrometallurgical processes such as, for example, solvent extraction, acid leaching, or base leaching. In one aspect, acid leaching can be carried out using hydrochloric acid, nitric acid, sulfuric acid, other strong acids, and combinations thereof. However, in some aspects, the efficiency of leaching processes and subsequent recovery of REEs are dependent upon the diffusion rates of acid solutions into the aluminosilicate glass particles that make up majority of CBA particles. Currently, the efficiency of acid leaching processes is highly limited and inefficient for extraction of REEs from CBA particles sources, since a majority of the REE content of CBA particles is distributed and isolated within these particles. In one aspect, the present disclosure provides an effective pre-treatment process for improving the kinetics and efficiency of concentrating and separating REEs from CBA particles during later hydrometallurgical recovery. In another aspect, CBA particles and related materials encompass a broad range of particle sizes, and the methods disclosed herein can be used on CBA particles of any size, or CBA particles and/or related materials encompassing numerous different particles sizes and/or particle size distributions in the same sample.

In a further aspect, disclosed herein is a microwave-assisted comminution process for achieving more efficient beneficiation as well as improved leaching kinetics and recovery of REEs from CBA particles. In one aspect, microwave heating is versatile, efficient, and directly interacts with a microwave-absorbing material, as opposed to radiant or conductive heating, which depend on absorption of electromagnetic energy. In a further aspect, the microwave energy absorbed by the samples disclosed herein is primarily dependent upon electronic interaction, which is proportional to frequency, dielectric permittivity, and dielectric loss tangent of the samples. In one aspect, the main constituents of CBA particles ($SiO_2$ and $Al_2O_3$) do not possess sufficient loss factors to allow dielectric heating and are thus transparent to microwaves at the frequency of 2.45 GHz.

In a further aspect, the present disclosure provides for various carbon sources to be mixed with CBA particles prior to microwave-assisted comminution. In one aspect, the carbon sources can be carbon black, carbon lampblack, activated carbon, carbon acetylene black (50% compressed, 90% compressed, or 100% compressed), charcoal, coal, similar materials, and mixtures thereof. In one aspect, the carbon source is not required to be 100% pure carbon in order for the disclosed methods to function as described. However, without wishing to be bound by theory, higher purity carbon sources may result in better microwave coupling and more complete processing of CBA particles and other CBA particles materials. In a further aspect, different carbon sources may possess different microwave coupling properties but these properties still lie within the disclosed ranges. In another aspect, different carbon sources can be mixed together to fine tune the microwave coupling properties. In some aspects, mixtures of different carbon sources may result in cost savings. In one aspect, the carbon sources are inexpensive. Further in this aspect, the carbon sources are significantly less costly than similar amounts of roasting additives. In a further aspect, these carbon-based materials are good microwave absorbers and can be easily heated by microwave radiation. In one aspect, materials with a combination of a moderate or high dielectric constant and high dielectric loss tangent provide optimum microwave energy coupling and rapidly convert microwave energy into thermal energy. In a further aspect, the carbon sources disclosed herein possess both of these properties. Without wishing to be bound by theory, in one aspect, heating mixtures of carbon sources and CBA particles creates a three-dimensional network between the CBA particles and carbon, thereby providing a rapid transfer of thermal energy from carbon to CBA particles. In a still further aspect, this method can cause rapid local heating and drastic temperature changes on the surface of the CBA particles, thereby leading to the formation of pores and microcracks. In some aspects, the CBA particles can be spherical. In one aspect, these pores and microcracks can enhance diffusion rates of acid solutions into the aluminosilicate CBA particles, and thus enhance acid interaction with REEs during hydrometallurgical recovery. In another aspect, this improvement in diffusion may enable the use of lower concentrations of acid solutions during hydrometallurgical recovery, further reducing processing costs and environmental hazards.

In one aspect, FIG. 1B shows an example method as disclosed herein for the specific aspect of utilizing coal fly ash. However, the method can also be applied to CBA particles, the method including the following steps:

(a) Desired amounts of CBA particles and carbon powders weighed separately.

(b) Weighed CBA particles and carbon powders are transferred into a container made of high-density polyethylene (HDPE), sealed, and dry roll milled.

(c) Homogeneous CBA-carbon powder mixtures are removed from the HDPE container.

(d) Desired amount of homogeneous powder is weighed in a weighing boat.

(e) Optionally, a stainless steel die is filled with the weighed powder.

(f) Optionally, following step (e), a uniaxial press is used to apply pressure to the weighed powder to form cylindrical pellets.

(g) Loose powders (if steps (e) and (f) are skipped) or cylindrical pellets (if steps (e) and (f) are performed) are placed into a heating vessel, e.g., an alumina crucible, which is in turn placed into a microwave cavity.

(h) Constant power or pulsed microwave processing is performed on the loose powders or cylindrical pellets is performed at different power levels at 2.45 GHz.

(i) Remove the beneficiated final product from the microwave cavity.

Further in this aspect, in step (a), the CBA particles can be used at volume percentages ranging from about 1 to about 99 vol %, or about 5, 10, 15, 20, 25, 30, 35, 40, 45, 50, 55, 60, 65, 70, 75, 80, 85, 90, 95, or 99 vol %, or a combination of any of the foregoing values, or a range encompassing any of the foregoing values. In various further aspects, the CBA particles can be used at 70, 80, 90, or 95 vol %. In a still further aspect, the CBA particles can be used at volume percentages ranging from about 30 to about 70 vol %. In a yet further aspect, the CBA particles can be used at volume percentages ranging from about 25 to about 75 vol %. In an even further aspect, the CBA particles can be used at volume percentages ranging from about 20 to about 80 vol %. In a still further aspect, the CBA particles can be used at volume percentages ranging from about 15 to about 85 vol %. In a yet further aspect, the CBA particles can be used at volume percentages ranging from about 10 to about 90 vol %. In an even further aspect, the CBA particles can be used at volume percentages ranging from about 5 to about 95 vol %. In a still further aspect, the CBA particles can be used at volume percentages ranging from about 70 to about 99 vol %. In a yet further aspect, the CBA particles can be used at volume percentages ranging from about 75 to about 99 vol %. In an even further aspect, the CBA particles can be used at volume percentages ranging from about 80 to about 99 vol %. In a still further aspect, the CBA particles can be used at volume percentages ranging from about 85 to about 99 vol %. In a still further aspect, the CBA particles can be used at volume percentages ranging from about 70 to about 95 vol %. In a yet further aspect, the CBA particles can be used at volume percentages ranging from about 75 to about 95 vol %. In an even further aspect, the CBA particles can be used at volume percentages ranging from about 80 to about 95 vol %. In a still further aspect, the CBA particles can be used at volume percentages ranging from about 85 to about 95 vol %. In a still further aspect, the CBA particles can be used at volume percentages ranging from about 90 to about 95 vol %. In a still further aspect, the CBA particles can be used at volume percentages ranging from about 70 to about 90 vol %. In a yet further aspect, the CBA particles can be used at volume percentages ranging from about 75 to about 90 vol %. In an even further aspect, the CBA particles can be used at volume percentages ranging from about 80 to about 90 vol %. In a still further aspect, the CBA particles can be used at volume percentages ranging from about 85 to about 90 vol %. In a still further aspect, the CBA particles can be used at volume percentages ranging from about 70 to about 85 vol %. In a yet further aspect, the CBA particles can be used at volume percentages ranging from about 75 to about 85 vol %. In an even further aspect, the CBA particles can be used at volume percentages ranging from about 80 to about 85 vol %. In a still further aspect, the CBA particles can be used at volume percentages ranging from about 70 to about 80 vol %. In a yet further aspect, the CBA particles can be used at volume percentages ranging from about 75 to about 80 vol %. In a still further aspect, the CBA particles can be used at volume percentages ranging from about 70 to about 75 vol %.

Further in this aspect, in step (a), the carbon sources can be used at volume percentages ranging that represent the vol % balance to achieve 100 vol % based on the vol % of CBA particles used. In a further aspect, the carbon sources can be used from about 1 to about 60 vol %, or about 1, 5, 10, 15, 20, 25, 30, 35, 40, 45, 50, 55, 60, 65, 70, 75, 80, 85, 90, 95, or 99 vol % or a combination of any of the foregoing values, or a range encompassing any of the foregoing values. In various further aspects, the carbon sources are used at 5, 10, 20, or 30 vol %. In a still further aspect, the carbon sources can be used at volume percentages ranging from about 1 to about 30 vol %. In a yet further aspect, the CBA particles can be used at volume percentages ranging from about 1 to about 25 vol %. In an even further aspect, the CBA particles can be used at volume percentages ranging from about 1 to about 20 vol %. In a still further aspect, the CBA particles can be used at volume percentages ranging from about 1 to about 15 vol %. In a yet further aspect, the CBA particles can be used at volume percentages ranging from about 1 to about 10 vol %. In an even further aspect, the CBA particles can be used at volume percentages ranging from about 1 to about 5 vol %. In a still further aspect, the CBA particles can be used at volume percentages ranging from about 1 to about 4.99 vol %. In a still further aspect, the carbon sources can be used at volume percentages ranging from about 5 to about 30 vol %. In a yet further aspect, the CBA particles can be used at volume percentages ranging from about 5 to about 25 vol %. In an even further aspect, the CBA particles can be used at volume percentages ranging from about 5 to about 20 vol %. In a still further aspect, the CBA particles can be used at volume percentages ranging from about 5 to about 15 vol %. In a yet further aspect, the CBA particles can be used at volume percentages ranging from about 5 to about 10 vol %. In a still further aspect, the carbon sources can be used at volume percentages ranging from about 10 to about 30 vol %. In a yet further aspect, the CBA particles can be used at volume percentages ranging from about 10 to about 25 vol %. In an even further aspect, the CBA particles can be used at volume percentages ranging from about 10 to about 20 vol %. In a still further aspect, the CBA particles can be used at volume percentages ranging from about 10 to about 15 vol %. In a still further aspect, the carbon sources can be used at volume percentages ranging from about 15 to about 30 vol %. In a yet further aspect, the CBA particles can be used at volume percentages ranging from about 15 to about 25 vol %. In an even further aspect, the CBA particles can be used at volume percentages ranging from about 15 to about 20 vol %. Without wishing to be bound by theory, a certain volume percentage of carbon source is required to obtain sufficient contact area between the carbon and CBA particles. In some aspects, samples using a carbon content at the lower end of the disclosed ranges may be less expensive and/or simpler to prepare.

In one aspect, when high carbon content (e.g., above 10 vol %) is used, sample temperature can reach 1200-1300° C. or higher. Further in this aspect, reaching a temperature this high can result in the formation of final CBA particles having a high density or even sintered form. In one aspect, a high density or sintered form is undesirable from a standpoint of later extracting REEs and other metals. Thus, in one aspect, balance between microwave power application and carbon content and distribution should be carefully controlled in order to maximize efficient carbothermal reduction of the CBA particles to produce the desired microstructural defects on and within CBA particles. In one aspect, during microwave irradiation, various parameters must be controlled in order to control local reduction of CBA particles as well as further CO gas and possible solid carbon transport into the defects formed in the CBA particles. In one aspect, transport of CO and carbon into the interior of a CBA particles particle will lead to further reduction of the transition metals and rare earths within the CBA particles, resulting in an increase in dissolution and separation of all metals later during hydrometallurgical recovery.

In one aspect, different carbon sources have different inorganic impurities and chemistries. In a further aspect, these impurities and chemistries partially determine the rates of microwave energy coupling and thus the efficiencies of the microwave-assisted comminution methods at the beneficiation stage of the disclosed method. In a still further aspect, the volume percentages of the carbon sources as well as processing parameters (see step (h)) are selected based on the microwave coupling properties of the various carbon sources.

In another aspect, in step (b), roll milling time is any time sufficient to obtain a homogeneous CBA particles-carbon loose powder mixture, or is from about 1 to about 24 hours, or is 1, 2, 3, 4, 5, 6, 7, 8, 9, 10, 11, 12, 13, 14, 15, 16, 17, 18, 19, 20, 21, 22, 23, or about 24 hours, or a combination of any of the foregoing values, or a range encompassing any of the foregoing values. Further in this aspect, obtaining a homogeneous carbon-CBA particles facilitates creation of the three-dimensional network between CBA particles and carbon as well as rapid transfer of thermal energy from the carbon particles as microwave absorbers to CBA particles during microwave pretreatment. In a further aspect, mixing time of the CBA particles and carbon source is optimized for achieving repeatable results with respect to composition of the CBA particles-carbon mixtures. Further in this aspect, this mixing is critical to obtaining similar microwave time and temperature profiles and beneficiated final products. In one aspect, the percolation and distribution of carbon within the CBA particles-carbon mixtures results in different microwave coupling including different heating mechanisms and profiles. Thus, in one aspect, depending upon the microstructural variations in the CBA particles-carbon mixtures, two composite compositions with the same volume content may heat differently and thus react to microwave treatment differently, thus leading to later differences in REE extraction. Thus, in any of the above aspects, mixing is critical to ensure homogeneity of CBA particles-carbon mixtures and reproducibility of results.

In still another aspect, in step (e), the stainless steel die is from 13-26 mm in diameter, or is 13, 14, 15, 16, 17, 18, 19, 20, 21, 22, 23, 24, 25, or 26 mm in diameter, or a combination of any of the foregoing values, or a range encompassing any of the foregoing values. In some aspects, steel dies smaller than 13 mm in diameter or larger than 26 mm in diameter can be used to generate smaller or larger pellets, respectively. Further in this aspect, the smaller or larger pellets can be successfully employed in the disclosed methods.

In one aspect, in step (f), about 13 to about 14 MPa of pressure is applied to the weighed powder, or about 13. 13.1, 13.2, 13.3, 13.4, 13.5, 13.6, 13.7, 13.8, 13.9, or about 14 MPa of pressure is applied, or a combination of any of the foregoing values, or a range encompassing any of the foregoing values. In a further aspect, the pellets thus formed are cylindrical with diameters ranging from 13-26 mm, or about 13, 14, 15, 16, 17, 18, 19, 20, 21, 22, 23, 24, 25, or 26 mm, or a combination of any of the foregoing values, or a range encompassing any of the foregoing values. In some aspects, the pellet diameter can be less than 13 mm or larger than 26 mm, depending on the size of the die used for pressing the pellet. In one aspect, the diameter of the pellets matches the diameter of the stainless steel die used to press the pellet. In a further aspect, the thickness of the pellet depends on the powder composition used to make the pellet. In one aspect, the pellet is from about 5 to about 20 mm thick, or is 5, 6, 7, 8, 9, 10, 11, 12, 13, 14, 15, 16, 17, 18, 19, or about 20 mm thick, or a combination of any of the foregoing values, or a range encompassing any of the foregoing values. In one aspect, the act of pressing leads to a further increase in the contact area between the CBA particles and carbon particles. In one aspect, pellets of different diameters can also be used. In any of the above aspects, the size of the steel die used and thus the size of the pellet generated can affect pressing parameters. In one aspect, for example, pressing a larger diameter, thicker pellet may require more pressure to be applied. Without wishing to be bound by theory, processing larger amounts of material (i.e., higher weights of loose powder mixtures or larger diameter and/or thicker pellets) at once leads to improved processing times and lower costs.

Further in this aspect, an aerosol lubricant such as, for example, zinc stearate, can be applied to the stainless steel die prior to filling the die with a CBA particles-carbon powder mixture. In one aspect, presence of the lubricant lowers the friction in the die during uniaxial pressing of the pellets. In another aspect, presence of the lubricant makes the release of the pressed pellets easier and prevents damage such as spallation or cracking of the pellets.

In one aspect, in step (g), if CBA particles-carbon loose powder mixtures are used, the powder should be weighed directly in the heating vessel, e.g., an alumina crucible, after the roll milling process and then transferred into the microwave cavity. Further in this aspect, performing this step eliminates segregation between CBA particles and carbon particles prior to microwave processing. Still further in this aspect, performing this step increases the efficiency of microwave-assisted comminution.

In one aspect, the microwave unit used for steps (g) and (h) has a large cavity, is sealed to eliminate microwave leakage, and is tested using a microwave leakage detector prior to operation of the microwave unit. In one aspect, in step (h), the power level is from about 0.5 to about 2.0 kW, or is 0.5, 1, 1.5 or about 2 kW, or a combination of any of the foregoing values, or a range encompassing any of the foregoing values. In a further aspect, the microwave power can be selected by a skilled artisan based on the volume percentage of the CBA particles and carbon materials in the loose powder mixtures or cylindrical pellets. In a further aspect, step (h) is carried out for a period of time from about 1 to about 30 minutes, or for about 1, 2, 5, 10, 15, 20, 25, or about 30 minutes, or a combination of any of the foregoing values, or a range encompassing any of the foregoing values. In one aspect, carbon content and microwave power level are selected to reach the desired temperature during the microwave-assisted comminution process disclosed herein. Further in this aspect, these two parameters are selected in tandem. Still further in this aspect, correct selection of these two parameters allows for the avoidance of uncontrolled processing and/or overheating.

In a still further aspect, the microwave processing can be carried out under an inert gas or under ambient air flow. In a further aspect, the inert gas can be argon, nitrogen, helium, or a combination thereof, or a combination of any of the foregoing inert gases in any proportion with ambient air. In one aspect, microwave processing is carried out under argon. In yet another aspect, the volumetric flow rate of the air or argon is from about 5 to about 100 standard cubic centimeters per minute (sccm) or is about 5, 10, 15, 20, 25, 30, 35, 40, 45, 50, 55, 60, 65, 70, 75, 80, 85, 90, 95, or about 100 sccm, or a combination of any of the foregoing values, or a range encompassing any of the foregoing values. In one aspect, the volumetric flow rate of the air or argon is from about 20 to about 50 sccm.

In one aspect, if the loose powder mixture or cylindrical pellet overheats following microwave processing, experimental parameters can be adjusted to achieve successful comminution. In one aspect, in the case of overheating, a new mixture can be prepared wherein the vol % of carbon is reduced relative to the amount of CBA particles. In an alternative aspect, a new mixture can be prepared wherein the vol % of the carbon and of the CBA particles remain the same, but microwave power or processing time is reduced. In one aspect, the skilled artisan will be able to detect overheating based on the occurrence of sintering and/or melting, which in turn results in loss of accessible pores and/or microcracks.

In one aspect, the microwave-assisted method disclosed herein induces rapid, local heating and reduction on the surfaces of the spherical aluminosilicate glass particles due to microwave coupling. Further in this aspect, defective structures such as pores and microcracks are formed in the CBA particles, thus leading to improvements in the diffusion rates of acid solutions into the CBA particles as well as improvements in interactions of acid with REEs during hydrometallurgical recovery.

Hydrometallurgical Recovery

In one aspect, provided herein is a method for hydrometallurgical recovery of REEs and other metals from coal ash (CA) particles beneficiated using the microwave-assisted processes disclosed herein. In some aspects, hydrometallurgical recovery includes an acid leaching step. In one aspect, acid leaching consists of contacting a microwave-comminuted CA particles sample with an aqueous acid solution. In a further aspect, the CA particles to liquid ratio can be from about 1:100 to about 5:100 (g:mL), or can be about 1:100, 1.5:100, 2:100, 2.5:100, 3:100, 3.5:100, 4:100, 4.5:100, or about 5:100, or a combination of any of the foregoing values, or a range encompassing any of the foregoing values. Further in this aspect, for example, 3 grams of CA particles can be contacted with 100 mL of acid solution to make a ratio of 3:100. In a further aspect, the process is scalable to larger masses and volumes of acid and is only limited by the volume of reaction tanks used, for example, on an industrial scale. In one aspect, total solids amount may be slightly adjusted to account for residual carbon remaining after microwave pretreatment. As an example, if the CA particles contains residual carbon, total solids of about 3.1 to about 3.4 can be stirred with 100 mL of acid solution to keep CA particles levels constant at about 3 g for a ratio of 3:100. This parameter can be adjusted based on knowledge of residual carbon content of a given sample.

In one aspect, the acid used for acid leaching in the hydrometallurgical recovery of REEs from CA particles beneficiated using the microwave-assisted processes disclosed herein can be hydrochloric, nitric, sulfuric, hydrofluoric acid, or a combination thereof. In another aspect, the acid concentration is from about 0.5 to about 2M, or is about 0.5, 1, 1.5, or about 2M. In a further aspect, acid leaching is conducted in a suitable glass or other acid-compatible vessel, flask, beaker, or reaction tank with stirring. In one aspect, stirring is conducted at a speed of from about 100 to about 250 rpm, or at a speed of about 100, 125, 150, 175, 200, 225, or about 250 rpm. In another aspect, the coal ash particles-acid mixture is heated during the acid leaching step. In one aspect, heating is from about 50 to about 90° C., or is about 50, 55, 60, 65, 70, 75, 80, 85, or about 90° C., or a combination of any of the foregoing values, or a range encompassing any of the foregoing values. In still another aspect, acid leaching is carried out for a period of time of from about 30 min to about 2 h, or for about 30 min, 1 h, 1.5 h, or about 2 h, or a combination of any of the foregoing values, or a range encompassing any of the foregoing values.

In one aspect, the acid used for acid leaching in the hydrometallurgical recovery of REEs from CA particles beneficiated using the microwave-assisted processes disclosed herein can be 1 M nitric acid, stirring speed can be 125 rpm, heating be at 85° C., reaction time is 1 h, and the ratio of coal ash particles to acid solution is 3:100 (g:mL).

In another aspect, after acid leaching, leached samples from CA particles beneficiated using the microwave-assisted processes disclosed herein can be can be filtered using filter paper (such as, for example, Whatman grade 2) or another appropriate filter means (i.e., for larger volumes) to minimize excess leaching time. Following hydrometallurgical recovery, elemental analysis of leachate can be performed to determine efficiency of the process. In one aspect, elemental analysis can be conducted using inductively coupled plasma mass spectrometry (ICP-MS), inductively coupled plasma optical emission spectroscopy (ICP-OES), another method for elemental analysis, or a combination thereof.

In one method, leaching efficiency ($\alpha$) can be calculated using the following equation:

$$\alpha = \frac{V \times C_2}{m \times C_1} \times 100\%$$

where V is the volume of the leachate (mL), m is the mass of the coal ash particles sample added to the leaching agent (g), $C_1$ is the concentration of an element in the starting (untreated) coal ash particles sample (µg/g), and $C_2$ is the concentration of an element in the leachate (µg/mL).

In one aspect, the leaching efficiency in the hydrometallurgical recovery of REEs from CA particles beneficiated using the microwave-assisted processes disclosed herein can be about 20%, 25%, 30%, 35%, 40%, 45%, 50%, 55%, 60%, 65%, 70%, 75%, 80%, 85%, 90%, or a combination of any of the foregoing values, or a range encompassing any of the foregoing values. In a further aspect, the leaching efficiency in the hydrometallurgical recovery of REEs from CA particles beneficiated using the microwave-assisted processes disclosed herein can be at least about 20%, 25%, 30%, 35%, 40%, 45%, 50%, 55%, 60%, 65%, 70%, 75%, 80%, 85%, 90%, or a combination of any of the foregoing values, or a range encompassing any of the foregoing values. In a still further aspect, the leaching efficiency in the hydrometallurgical recovery of REEs from CA particles beneficiated using the microwave-assisted processes disclosed herein can be from about 20% to about 90%. In a yet further aspect, the leaching efficiency in the hydrometallurgical recovery of REEs from CA particles beneficiated using the microwave-assisted processes disclosed herein can be from about 25% to about 90%. In an even further aspect, the leaching efficiency in the hydrometallurgical recovery of REEs from CA particles beneficiated using the microwave-assisted processes disclosed herein can be from about 30% to about 90%. In a still further aspect, the leaching efficiency in the hydrometallurgical recovery of REEs from CA particles beneficiated using the microwave-assisted processes disclosed herein can be from about 35% to about 90%. In a yet further aspect, the leaching efficiency in the hydrometallurgical recovery of REEs from CA particles beneficiated using the microwave-assisted processes disclosed herein can be from about 40% to about 90%. In an even further aspect, the leaching efficiency in the hydrometallurgical recovery of REEs from CA particles beneficiated using the microwave-assisted processes disclosed herein can be from about 45% to about 90%. In a still further aspect, the leaching efficiency in the hydrometallurgical recovery of REEs from CA particles beneficiated using the microwave-assisted processes disclosed herein can be from about 50% to about 90%. In a yet further aspect, the leaching efficiency in the hydrometallurgical recovery of REEs from CA particles beneficiated using the microwave-assisted processes disclosed herein can be from about 55% to about 90%. In an even further aspect, the leaching efficiency in the hydrometallurgical recovery of REEs from CA particles beneficiated using the microwave-assisted processes disclosed herein can be from about 60% to about 90%. In a still further aspect, the leaching efficiency in the hydrometallurgical recovery of REEs from CA particles beneficiated using the microwave-assisted processes disclosed herein can be from about 65% to about 90%.

In one aspect, provided herein is a method for hydrometallurgical recovery of REEs and other metals from coal fly ash (CFA) particles beneficiated using the microwave-assisted processes disclosed herein. In some aspects, hydrometallurgical recovery includes an acid leaching step. In one aspect, acid leaching consists of contacting a microwave-comminuted CFA particles sample with an aqueous acid solution. In a further aspect, the CFA particles to liquid ratio can be from about 1:100 to about 5:100 (g:mL), or can be about 1:100, 1.5:100, 2:100, 2.5:100, 3:100, 3.5:100, 4:100, 4.5:100, or about 5:100, or a combination of any of the foregoing values, or a range encompassing any of the foregoing values. Further in this aspect, for example, 3 grams of CFA particles can be contacted with 100 mL of acid solution to make a ratio of 3:100. In a further aspect, the process is scalable to larger masses and volumes of acid and is only limited by the volume of reaction tanks used, for example, on an industrial scale. In one aspect, total solids amount may be slightly adjusted to account for residual carbon remaining after microwave pretreatment. As an example, if the CFA particles contains residual carbon, total solids of about 3.1 to about 3.4 can be stirred with 100 mL of acid solution to keep CFA particles levels constant at about 3 g for a ratio of 3:100. This parameter can be adjusted based on knowledge of residual carbon content of a given sample.

In one aspect, the acid used for acid leaching in the hydrometallurgical recovery of REEs from CFA particles beneficiated using the microwave-assisted processes disclosed herein can be hydrochloric, nitric, sulfuric, hydrofluoric acid, or a combination thereof. In another aspect, the acid concentration is from about 0.5 to about 2M, or is about 0.5, 1, 1.5, or about 2M. In a further aspect, acid leaching is conducted in a suitable glass or other acid-compatible vessel, flask, beaker, or reaction tank with stirring. In one aspect, stirring is conducted at a speed of from about 100 to about 250 rpm, or at a speed of about 100, 125, 150, 175, 200, 225, or about 250 rpm. In another aspect, the coal ash particles-acid mixture is heated during the acid leaching step. In one aspect, heating is from about 50 to about 90° C., or is about 50, 55, 60, 65, 70, 75, 80, 85, or about 90° C., or a combination of any of the foregoing values, or a range encompassing any of the foregoing values. In still another aspect, acid leaching is carried out for a period of time of from about 30 min to about 2 h, or for about 30 min, 1 h, 1.5 h, or about 2 h, or a combination of any of the foregoing values, or a range encompassing any of the foregoing values.

In one aspect, the acid used for acid leaching in the hydrometallurgical recovery of REEs from CFA particles beneficiated using the microwave-assisted processes disclosed herein can be 1 M nitric acid, stirring speed can be 125 rpm, heating be at 85° C., reaction time is 1 h, and the ratio of coal ash particles to acid solution is 3:100 (g:mL).

In another aspect, after acid leaching, leached samples from CFA particles beneficiated using the microwave-assisted processes disclosed herein can be can be filtered using filter paper (such as, for example, Whatman grade 2) or another appropriate filter means (i.e., for larger volumes) to minimize excess leaching time. Following hydrometallurgical recovery, elemental analysis of leachate can be performed to determine efficiency of the process. In one aspect, elemental analysis can be conducted using inductively coupled plasma mass spectrometry (ICP-MS), inductively coupled plasma optical emission spectroscopy (ICP-OES), another method for elemental analysis, or a combination thereof.

In one method, leaching efficiency (a) can be calculated using the following equation:

$$\alpha = \frac{V \times C_2}{m \times C_1} \times 100\%$$

where V is the volume of the leachate (mL), m is the mass of the coal ash particles sample added to the leaching agent (g), $C_1$ is the concentration of an element in the starting (untreated) coal ash particles sample (µg/g), and $C_2$ is the concentration of an element in the leachate (µg/mL).

In one aspect, the leaching efficiency in the hydrometallurgical recovery of REEs from CFA particles beneficiated using the microwave-assisted processes disclosed herein can be about 20%, 25%, 30%, 35%, 40%, 45%, 50%, 55%, 60%, 65%, 70%, 75%, 80%, 85%, 90%, or a combination of any of the foregoing values, or a range encompassing any of the foregoing values. In a further aspect, the leaching efficiency in the hydrometallurgical recovery of REEs from CFA particles beneficiated using the microwave-assisted processes disclosed herein can be at least about 20%, 25%, 30%, 35%, 40%, 45%, 50%, 55%, 60%, 65%, 70%, 75%, 80%, 85%, 90%, or a combination of any of the foregoing values, or a range encompassing any of the foregoing values. In a still further aspect, the leaching efficiency in the hydrometallurgical recovery of REEs from CFA particles beneficiated using the microwave-assisted processes disclosed herein can be from about 20% to about 90%. In a yet further aspect, the leaching efficiency in the hydrometallurgical recovery of REEs from CFA particles beneficiated using the microwave-assisted processes disclosed herein can be from about 25% to about 90%. In an even further aspect, the leaching efficiency in the hydrometallurgical recovery of REEs from CFA particles beneficiated using the microwave-assisted processes disclosed herein can be from about 30% to about 90%. In a still further aspect, the leaching efficiency in the hydrometallurgical recovery of REEs from CFA particles beneficiated using the microwave-assisted processes disclosed herein can be from about 35% to about 90%. In a yet further aspect, the leaching efficiency in the hydrometallurgical recovery of REEs from CFA particles beneficiated using the microwave-assisted processes disclosed herein can be from about 40% to about 90%. In an even further aspect, the leaching efficiency in the hydrometallurgical recovery of REEs from CFA particles beneficiated using the microwave-assisted processes disclosed herein can be from about 45% to about 90%. In a still further aspect, the leaching efficiency in the hydrometallurgical recovery of REEs from CFA particles beneficiated using the microwave-assisted processes disclosed herein can be from about 50% to about 90%. In a yet further aspect, the leaching efficiency in the hydrometallurgical recovery of REEs from CFA particles beneficiated using the microwave-assisted processes disclosed herein can be from about 55% to about 90%. In an even further aspect, the leaching efficiency in the hydrometallurgical recovery of REEs from CFA particles beneficiated using the microwave-assisted processes disclosed herein can be from about 60% to about 90%. In a still further aspect, the leaching efficiency in the hydrometallurgical recovery of REEs from CFA particles beneficiated using the microwave-assisted processes disclosed herein can be from about 65% to about 90%.

In one aspect, provided herein is a method for hydrometallurgical recovery of REEs and other metals from coal bottom ash (CBA) particles beneficiated using the microwave-assisted processes disclosed herein. In some aspects, hydrometallurgical recovery includes an acid leaching step. In one aspect, acid leaching consists of contacting a microwave-comminuted CBA particles sample with an aqueous acid solution. In a further aspect, the CBA particles to liquid ratio can be from about 1:100 to about 5:100 (g:mL), or can be about 1:100, 1.5:100, 2:100, 2.5:100, 3:100, 3.5:100, 4:100, 4.5:100, or about 5:100, or a combination of any of the foregoing values, or a range encompassing any of the foregoing values. Further in this aspect, for example, 3 grams of CBA particles can be contacted with 100 mL of acid solution to make a ratio of 3:100. In a further aspect, the process is scalable to larger masses and volumes of acid and is only limited by the volume of reaction tanks used, for example, on an industrial scale. In one aspect, total solids amount may be slightly adjusted to account for residual carbon remaining after microwave pretreatment. As an example, if the CBA particles contains residual carbon, total solids of about 3.1 to about 3.4 can be stirred with 100 mL of acid solution to keep CBA particles levels constant at about 3 g for a ratio of 3:100. This parameter can be adjusted based on knowledge of residual carbon content of a given sample.

In one aspect, the acid used for acid leaching in the hydrometallurgical recovery of REEs from CBA particles beneficiated using the microwave-assisted processes disclosed herein can be hydrochloric, nitric, sulfuric, hydrofluoric acid, or a combination thereof. In another aspect, the acid concentration is from about 0.5 to about 2M, or is about 0.5, 1, 1.5, or about 2M. In a further aspect, acid leaching is conducted in a suitable glass or other acid-compatible vessel, flask, beaker, or reaction tank with stirring. In one aspect, stirring is conducted at a speed of from about 100 to about 250 rpm, or at a speed of about 100, 125, 150, 175, 200, 225, or about 250 rpm. In another aspect, the coal ash particles-acid mixture is heated during the acid leaching step. In one aspect, heating is from about 50 to about 90° C., or is about 50, 55, 60, 65, 70, 75, 80, 85, or about 90° C., or a combination of any of the foregoing values, or a range encompassing any of the foregoing values. In still another aspect, acid leaching is carried out for a period of time of from about 30 min to about 2 h, or for about 30 min, 1 h, 1.5 h, or about 2 h, or a combination of any of the foregoing values, or a range encompassing any of the foregoing values.

In one aspect, the acid used for acid leaching in the hydrometallurgical recovery of REEs from CBA particles beneficiated using the microwave-assisted processes disclosed herein can be 1 M nitric acid, stirring speed can be 125 rpm, heating be at 85° C., reaction time is 1 h, and the ratio of coal ash particles to acid solution is 3:100 (g:mL).

In another aspect, after acid leaching, leached samples from CBA particles beneficiated using the microwave-assisted processes disclosed herein can be can be filtered using filter paper (such as, for example, Whatman grade 2) or another appropriate filter means (i.e., for larger volumes) to minimize excess leaching time. Following hydrometallurgical recovery, elemental analysis of leachate can be performed to determine efficiency of the process. In one aspect, elemental analysis can be conducted using inductively coupled plasma mass spectrometry (ICP-MS), inductively coupled plasma optical emission spectroscopy (ICP-OES), another method for elemental analysis, or a combination thereof.

In one method, leaching efficiency ($\alpha$) can be calculated using the following equation:

$$\alpha = \frac{V \times C_2}{m \times C_1} \times 100\%$$

where V is the volume of the leachate (mL), m is the mass of the coal ash particles sample added to the leaching agent (g), $C_1$ is the concentration of an element in the starting (untreated) coal ash particles sample (µg/g), and $C_2$ is the concentration of an element in the leachate (µg/mL).

In one aspect, the leaching efficiency in the hydrometallurgical recovery of REEs from CBA particles beneficiated using the microwave-assisted processes disclosed herein can be about 20%, 25%, 30%, 35%, 40%, 45%, 50%, 55%, 60%, 65%, 70%, 75%, 80%, 85%, 90%, or a combination of any of the foregoing values, or a range encompassing any of the foregoing values. In a further aspect, the leaching efficiency in the hydrometallurgical recovery of REEs from CBA particles beneficiated using the microwave-assisted processes disclosed herein can be at least about 20%, 25%, 30%, 35%, 40%, 45%, 50%, 55%, 60%, 65%, 70%, 75%, 80%, 85%, 90%, or a combination of any of the foregoing values, or a range encompassing any of the foregoing values. In a still further aspect, the leaching efficiency in the hydrometallurgical recovery of REEs from CBA particles beneficiated using the microwave-assisted processes disclosed herein can be from about 20% to about 90%. In a yet further aspect, the leaching efficiency in the hydrometallurgical recovery of REEs from CBA particles beneficiated using the microwave-assisted processes disclosed herein can be from about 25% to about 90%. In an even further aspect, the leaching efficiency in the hydrometallurgical recovery of REEs from CBA particles beneficiated using the microwave-assisted processes disclosed herein can be from about 30% to about 90%. In a still further aspect, the leaching efficiency in the hydrometallurgical recovery of REEs from CBA particles beneficiated using the microwave-assisted processes disclosed herein can be from about 35% to about 90%. In a yet further aspect, the leaching efficiency in the hydrometallurgical recovery of REEs from CBA particles beneficiated using the microwave-assisted processes disclosed herein can be from about 40% to about 90%. In an even further aspect, the leaching efficiency in the hydrometallurgical recovery of REEs from CBA particles beneficiated using the microwave-assisted processes disclosed herein can be from about 45% to about 90%. In a still further aspect, the leaching efficiency in the hydrometallurgical recovery of REEs from CBA particles beneficiated using the microwave-assisted processes disclosed herein can be from about 50% to about 90%. In a yet further aspect, the leaching efficiency in the hydrometallurgical recovery of REEs from CBA particles beneficiated using the microwave-assisted processes disclosed herein can be from about 55% to about 90%. In an even further aspect, the leaching efficiency in the hydrometallurgical recovery of REEs from CBA particles beneficiated using the microwave-assisted processes disclosed herein can be from about 60% to about 90%. In a still further aspect, the leaching efficiency in the hydrometallurgical recovery of REEs from CBA particles beneficiated using the microwave-assisted processes disclosed herein can be from about 65% to about 90%.

Modifications of the Disclosed Methods and Processes

In one aspect, the processes and methods disclosed herein can be used on other coal-burning waste products. In another aspect, total REE concentration, microstructure, and mineralogical properties of coal ash particles are known to be highly dependent upon the type of coal used, combustion technique, processing parameters (e.g., temperature, air/fuel ratio, etc.), and collection or disposal sites (e.g., baghouse, air preheater, electrostatic precipitator, bottom hopper, etc.). In a further aspect, due to these variations, the microwave-assisted comminution processing parameters disclosed herein will need to be adjusted according to the type of coal ash, based on the type of coal used in a combustion process, in order to achieve maximum enrichment and extraction of REEs. In one aspect, coal ash from a bottom hopper, i.e., CBA, is not fine grained and has a structure generally dissimilar to that of CFA.

In a still further aspect, microwave comminution methods can improve recovery rates of REEs from various types of CA, e.g., CBA, as well, though it is expected that conditions will be different from optimum parameters for CFA. In one aspect, microwave processed coal ash microstructure has some similarities with CFA structure. In a further aspect, this microstructure indicates shorter microwave bursts with heating under 1000° C. will be more effective for beneficiation of coal ash.

In a further aspect, coal ash can be from about 50 to about 90 vol % of the coal ash/carbon mixture. Further in this aspect, when coal ash is from about 50 to about 90 vol %, the carbon material (e.g., carbon lampblack, acetylene black, etc.) can be from about 10 to about 50 vol % of the mixture. In another aspect, the coal ash can be used at volume percentages ranging from about 1 to about 99 vol %, or about 5, 10, 15, 20, 25, 30, 35, 40, 45, 50, 55, 60, 65, 70, 75, 80, 85, 90, 95, or 99 vol %, or a combination of any of the foregoing values, or a range encompassing any of the foregoing values. The carbon material (e.g., carbon lampblack, acetylene black, etc.) can be from about 1, 5, 10, 15, 20, 25, 30, 35, 40, 45, 50, 55, 60, 65, 70, 75, 80, 85, 90, 95, or 99 vol % or a combination of any of the foregoing values, or a range encompassing any of the foregoing values.

In one aspect, other waste materials, ores, and raw materials containing REEs can be processed by the methods disclosed herein. In a further aspect, materials for which the disclosed materials are useful include coal ash, class C coal fly ash, class F coal fly ash, apatite-based ores, bastnasite, monazite, xenotime, related materials, and mixtures thereof. In one aspect, the methods disclosed herein can be successfully used on any coal ash, CFA, or other material containing REEs, regardless of REE concentration.

Aspects

The following listing of exemplary aspects supports and is supported by the disclosure provided herein.

Aspect 1. A method for beneficiating coal fly ash, the method comprising: (a) providing coal ash particles; (b) providing a carbon source; (c) mixing the coal ash particles and carbon source to create a first mixture; (d) transferring the first mixture to a heating vessel; (e) placing the heating vessel in a microwave cavity; and (f) microwave processing the first mixture to generate processed coal fly ash particles; wherein the method creates defects in the processed coal ash particles.

Aspect 2. The method of Aspect 1, wherein the coal ash particles are coal fly ash, coal base ash, or a combination thereof.

Aspect 3. The method of Aspect 2, wherein the coal ash particles are coal fly ash.

Aspect 4. The method of any one of Aspect 1-Aspect 3, wherein the carbon source comprises carbon black, carbon lampblack, activated carbon, 50% compressed, carbon acetylene black, 90% compressed carbon acetylene black, 100% compressed carbon acetylene black, charcoal, coal, or a combination thereof.

Aspect 5. The method of Aspect 4, wherein the carbon source comprises carbon lampblack.

Aspect 6. The method of any one of Aspect 1-Aspect 5, wherein the coal fly ash particles and the carbon source are present in a ratio of from 95:5 vol % to 70:30 vol %.

Aspect 7. The method of Aspect 6, wherein the coal fly ash particles and the carbon source are present in a ratio of 80:20 vol %.

Aspect 8. The method of any one of Aspect 1-Aspect 7, wherein in step (c), mixing is accomplished by dry roll milling.

Aspect 9. The method of Aspect 8, wherein mixing is conducted in a high-density polyethylene vessel.

Aspect 10. The method of Aspect 8 or Aspect 9, wherein mixing is conducted fora period of 1 hour.

Aspect 11. The method of any one of Aspect 1-Aspect 10, further comprising pressing the first mixture into a pellet as a step between steps (c) and (d).

Aspect 12. The method of Aspect 11, wherein the pressing into a pellet is pressing using a steel die.

Aspect 13. The method of Aspect 12, wherein 13 to 14 MPa of uniaxial pressure is applied to the steel die to create the pellet.

Aspect 14. The method of any one of Aspect 11-Aspect 13, wherein the pellet has a diameter of from 13 to 26 mm and a thickness of from 5 to 20 mm.

Aspect 15. The method of any one of Aspect 12-Aspect 14, wherein a lubricant is applied to the steel die prior to adding the first mixture to the steel die.

Aspect 16. The method of any one of Aspect 1-Aspect 15, wherein the heating vessel is a crucible.

Aspect 17. The method of Aspect 16, wherein the crucible comprises alumina.

Aspect 18. The method of any one of Aspect 1-Aspect 17, wherein the microwave processing is conducted at a frequency of 2.45 GHz at constant power or pulsed power.

Aspect 19. The method of any one of Aspect 1-Aspect 18, wherein the microwave processing is conducted for a period of from 1 minute to 30 minutes.

Aspect 20. The method of Aspect 18, wherein the microwave processing is conducted for a period of from 2 minutes to 10 minutes.

Aspect 21. The method of any one of Aspect 1-Aspect 20, wherein the microwave processing is conducted at a power level of from 0.5 to 2 kW.

Aspect 22. The method of Aspect 20, wherein the microwave processing is conducted at a power level of 2 kW.

Aspect 23. The method of any one of Aspect 1-Aspect 22, wherein microwave processing of the first mixture results in heating of the first mixture to a temperature of from 1000° C. to 1350° C.

Aspect 24. The method of any one of Aspect 1-Aspect 23, wherein microwave processing of the first mixture is conducted under a flow of gas flow and where the gas comprises air or argon.

Aspect 25. The method of Aspect 23, wherein the flow of gas has a volumetric flow rate of from 5 to 100 standard cubic centimeters per minute (sccm).

Aspect 26. The method of Aspect 24, wherein the gas is argon and the volumetric flow rate is from 20 to 50 sccm.

Aspect 27. The method of any one of Aspect 1-Aspect 26, wherein the carbon source comprises carbon lampblack, wherein the coal fly ash particles and the carbon source are present in a ratio of 80:20 vol %, and wherein microwave processing is conducted for a period of 10 minutes.

Aspect 28. The method of any one of Aspect 1-Aspect 27, wherein the defects on the processed coal fly ash particles comprise cracks, pores, or a combination thereof.

Aspect 29. A method for hydrometallurgical recovery of rare earth elements from coal ash particles, the method comprising performing an acid leaching step on the processed coal ash particles of any one of Aspect 1-Aspect 28.

Aspect 30. The method of Aspect 29, wherein the acid leaching step is performed with an aqueous solution comprising nitric acid, hydrochloric acid, sulfuric acid, hydrofluoric acid, or a combination thereof.

Aspect 31. The method of Aspect 29 or Aspect 30, wherein the aqueous solution comprises nitric acid.

Aspect 32. The method of Aspect 31, wherein the nitric acid has a concentration of 1 M in the aqueous solution.

Aspect 33. The method of any one of Aspect 29-Aspect 32, wherein acid leaching is conducted for a period of from 30 minutes to 2 hours.

Aspect 34. The method of any one of Aspect 29-Aspect 33, wherein acid leaching is conducted with stirring at a speed of from 100 to 250 rpm.

Aspect 35. The method of any one of Aspect 29-Aspect 34, wherein acid leaching is conducted with heating to a temperature of from 50° C. to 90° C.

Aspect 36. The method of any one of Aspect 29-Aspect 35, wherein acid leaching is conducted with a ratio of from 1 to 5 grams per mL of aqueous solution.

Aspect 37. The method of any one of Aspect 29-Aspect 36, wherein acid leaching is performed on 3 grams of processed coal fly ash particles with an aqueous solution comprising 100 mL of 1 M nitric acid for 1 hour at 85° C. with stirring at 125 rpm.

Aspect 38. The method of any one of Aspect 29-Aspect 37, wherein the coal ash particles are coal fly ash, coal base ash, or a combination thereof.

Aspect 39. The method of Aspect 38, wherein the coal ash particles are coal fly ash.

Aspect 40. The method of any one of Aspect 29-Aspect 39, wherein the metals comprise rare earth elements.

Aspect 41. The method of Aspect 40, wherein the method results in recovery of over 50% of rare earth elements originally present in the coal ash particles.

Aspect 42. The method of Aspect 41, wherein the method results in recovery of over 70% of rare earth elements originally present in the coal ash particles.

Aspect 43. The method of Aspect 41, wherein the method results in recovery of over 90% of rare earth elements originally present in the coal ash particles.

Aspect 44. A composition comprising rare earth elements produced by the method of any one of Aspect 1-Aspect 28 and/or any one of Aspect 29-Aspect 43.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Materials

Coal fly ash (CFA) samples were collected from the baghouse of the Longview Power Plant in Maidsville, VW, USA, and were provided by the West Virginia Water Research Institute (WVWRI) at West Virginia University. Elemental analysis of the starting CFA sample was also provided by the WVWRI. Due to the poor microwave absorbing nature of the major constituents of CFA ($Al_2O_3$, $SiO_2$), carbon lampblack powder (Fisher Scientific, Fair Lawn, NJ) was used as a microwave absorber. A laser diffraction particle size analyzer (Mastersizer 2000S, Malvern Instruments, Malvern, UK) was used to determine the median particle sizes (d50) of the CFA and carbon lampblack. The Brunauer-Emmett-Teller (BET) technique (Micromeritics ASAP 2020, Norcross, GA) was used to measure the specific surface areas of the particles of CFA and carbon lampblack. Apparent density was measured using a helium pycnometer (AccuPyc II 1340, Micromeritics). Selected properties of the CFA and carbon lampblack are presented in Table 1 below.

TABLE 1

| Property | CFA | Carbon Lampblack |
| --- | --- | --- |
| Median particle size (d50, μm) | 9.4 | 3.3 |
| d10 (μm) | 1.4 | — |
| d90 (μm) | 25.9 | — |
| Specific surface area ($m^2/g$) | 0.9 | 28.7 |
| Apparent density ($g/cm^3$) | 2.37 | — |

Nitric acid solution (68-70% $HNO_3$, ACS grade, Alfa Aesar, Ward Hill, MA) and deionized water were used to prepare all acid solutions for leaching studies.

Example 2: Microwave Pretreatment Process and Characterization

A general (FIG. 1B) and an exemplary (FIG. 1A) process flowchart show the disclosed process starting from sample preparation to microwave pretreatment. 70-95 vol % CFA powders were mixed with 5-30 vol % carbon lampblack powder using dry roll milling for 1 h to achieve homogeneous loose CFA-carbon powder mixtures. Four different powder mixtures (95-5, 90-10, 80-20, and 70-30 vol % CFA-carbon) were prepared using this technique. This step was found to be critical for creating a three-dimensional network among particles. This step further was found to enhance thermal energy transfer from carbon to the glassy aluminosilicate particles and to generate localized heat zones for the formation of cracks and pores. 1.0-2.0 g of CFA-carbon mixtures were weighed and pressed into cylindrical pellets with a diameter of 13 mm using a uniaxial press (~13 MPa). Pellet thickness ranged from 8 to 20 mm. Depending on the experiment, pellets or loose powder mixtures were placed into an alumina crucible and transferred to an insulating chamber located in the microwave cavity. Most microwave studies were conducted with pellet samples; a few of these were compared with loose powder samples to understand the influence of sample type. The insulating chamber consisted of insulations transparent to microwave radiation (alumina refractory, 80-20 vol % alumina-silica fiber) to minimize thermal gradients.

For microwave pretreatment, an industrial-size, multimode microwave reactor with a cavity size of about 8 ft³ (Hadron Technologies, Inc., Arvada, CO) was operated at a frequency of 2.45 GHz. An optical radiation pyrometer was used to externally monitor and record real-time temperatures above 550° C. during the experiments. The microwave power unit and optical pyrometer were connected and controlled by a LabVIEW program (National Instruments, Austin, TX) and time-temperature heating profiles were recorded during all experiments. Microwave pretreatment experiments were conducted at 2.0 kW constant power for 2, 5, and 10 min under approximately 50 sccm of argon flow. When microwave pretreatment was completed, microwave power was turned off and the unit was allowed to cool.

After the microwave beneficiation process, solid samples were collected and weight changes were recorded. It was assumed that all weight loss was due to carbon. In a typical 95-5, 90-10, or 80-20 vol % sample, no carbon was left after microwave experiments, while residual carbon remained in the 70-30 vol % samples.

Samples were lightly ground in a mortar and pestle for 5-10 min and sieved using a 44 μm size (325 mesh) sieve to break up the initial compacted material. Phase analyses of the starting CFA and microwave-treated samples were performed by X-ray diffraction using a $CuK_\alpha$ radiation source (XRD, Panalytical X'Pert Pro, Westborough, MA) and microstructural characterization was carried out using a scanning electron microscope (Hitachi S-4700F, Tokyo, Japan). Average size of the starting CFA particles was measured using ImageJ software (National Institutes of Health, Bethesda, MD, and Laboratory for Optical and Computational Instrumentation, University of Wisconsin, Madison, WI). Energy dispersive spectroscopy (EDS) was used for elemental analysis of the starting CFA powder.

Example 3: Acid Leaching Studies

Acid leaching studies were conducted to understand the influence of microwave pretreatment on the enrichment and extraction of rare earth elements (REEs) and of certain metals. Light leaching experiments were conducted using 1.0 M nitric acid for 1 h in an Erlenmeyer flask with stirring at 125 rpm and heating to 85° C. CFA to liquid ratio was 3:100 g:mL. Total solid amount was slightly adjusted to ~3.1-3.4 g to keep CFA constant at 3 g for all leaching experiments, if residual carbon remained after microwave pretreatment.

After acid leaching, leached samples were immediately filtered using filter paper (Whatman grade 2) to minimize excess leaching time. Elemental analyses of leachate for REEs were performed using an inductively coupled plasma mass spectrometer (ICP-MS, NexION 2000, PerkinElmer, Shelton, CT). Leaching efficiency (α) was calculated using the following equation:

$$\alpha = \frac{V \times C_2}{m \times C_1} \times 100\%$$

where V is the volume of the leachate (mL), m is the mass of the CFA sample added to the leaching agent (g), $C_1$ is the concentration of an element in the starting (untreated) CFA sample (μg/g), and $C_2$ is the concentration of an element in the leachate measured by ICP-MS (μg/mL).

Example 4: Elemental and Microstructural Analysis of Starting CFA

Elemental Analysis

Figure 2A:
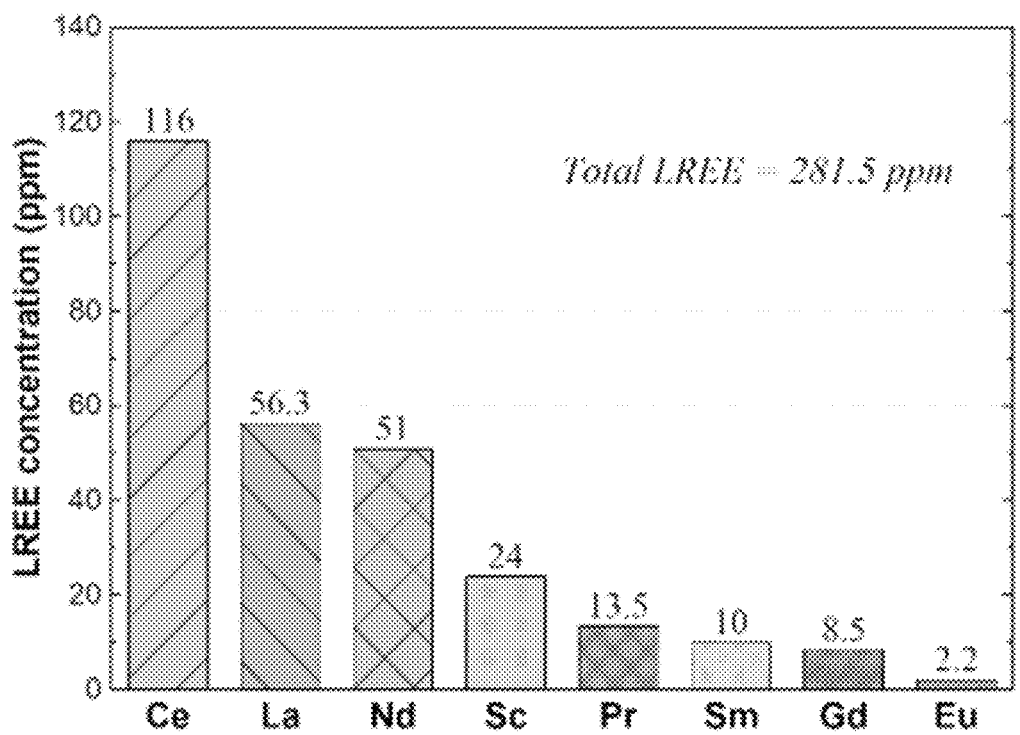
FIGS. 2A-2C shows representative elemental analysis of a starting coal fly ash (CFA) powder.
Figure 2B:
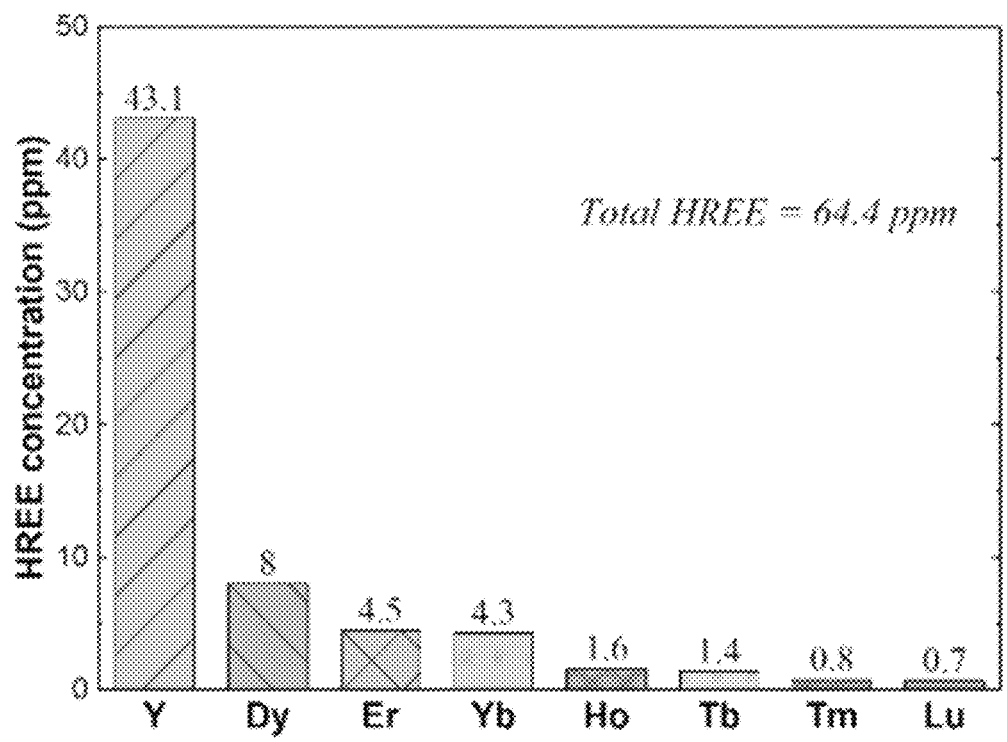
Figure 2C:
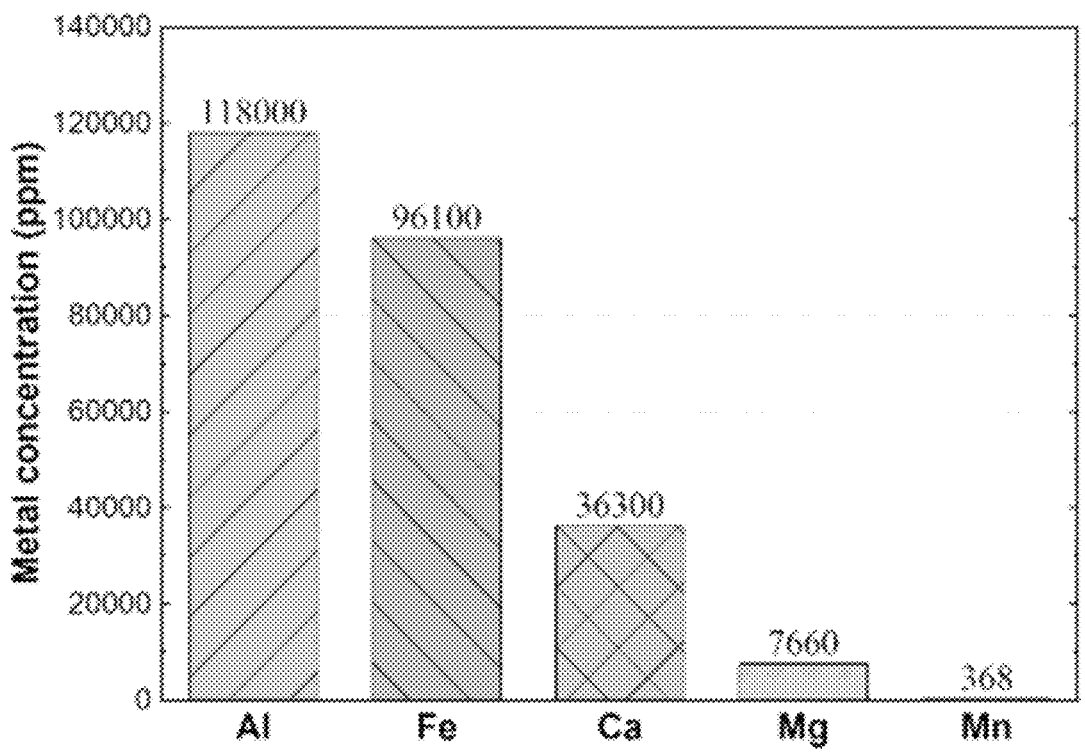
Figure 3A:
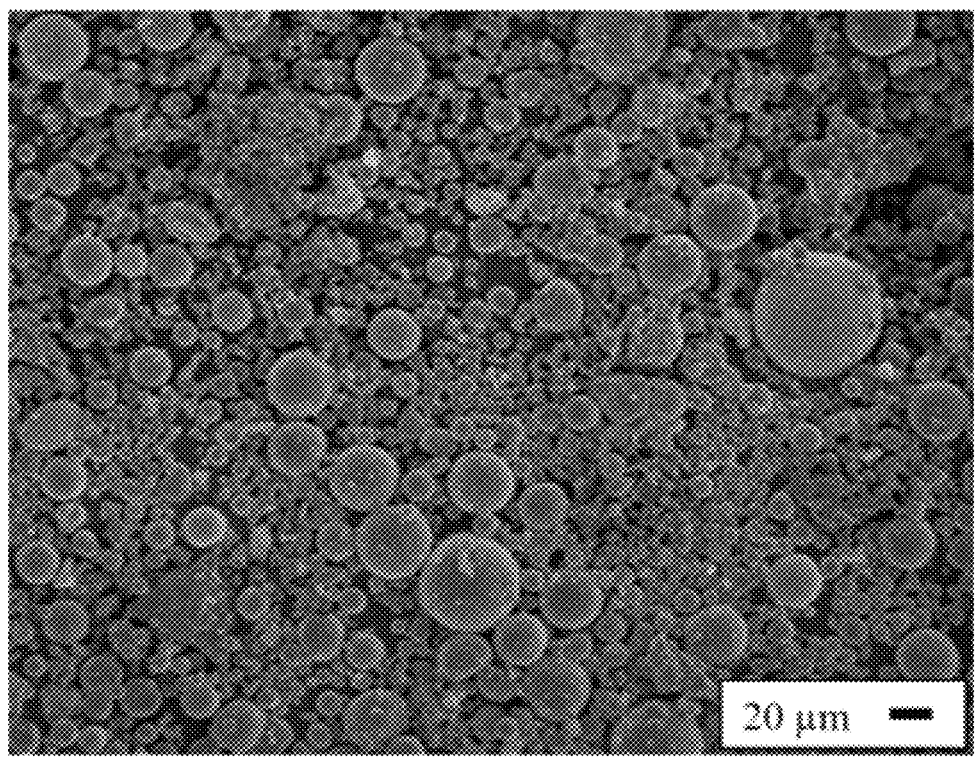
FIGS. 3A-3F show representative scanning electron micrographs (SEM) of microstructures and energy-dispersive X-ray spectroscopy (EDS) obtained from a representative starting CFA powder.
Figure 3B:
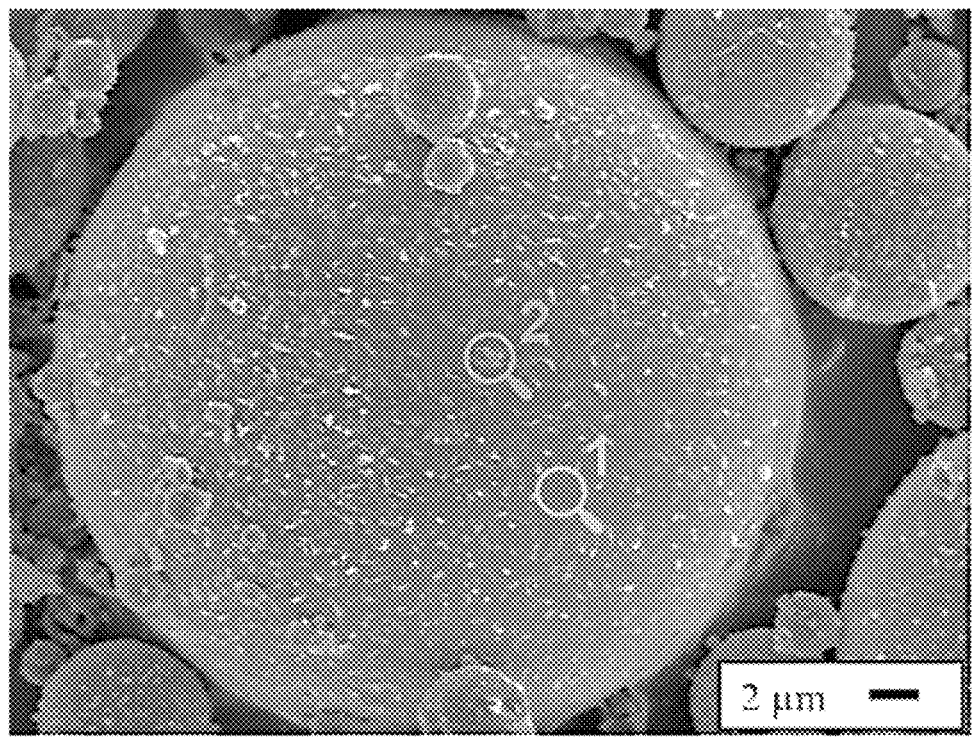
Figure 3C:
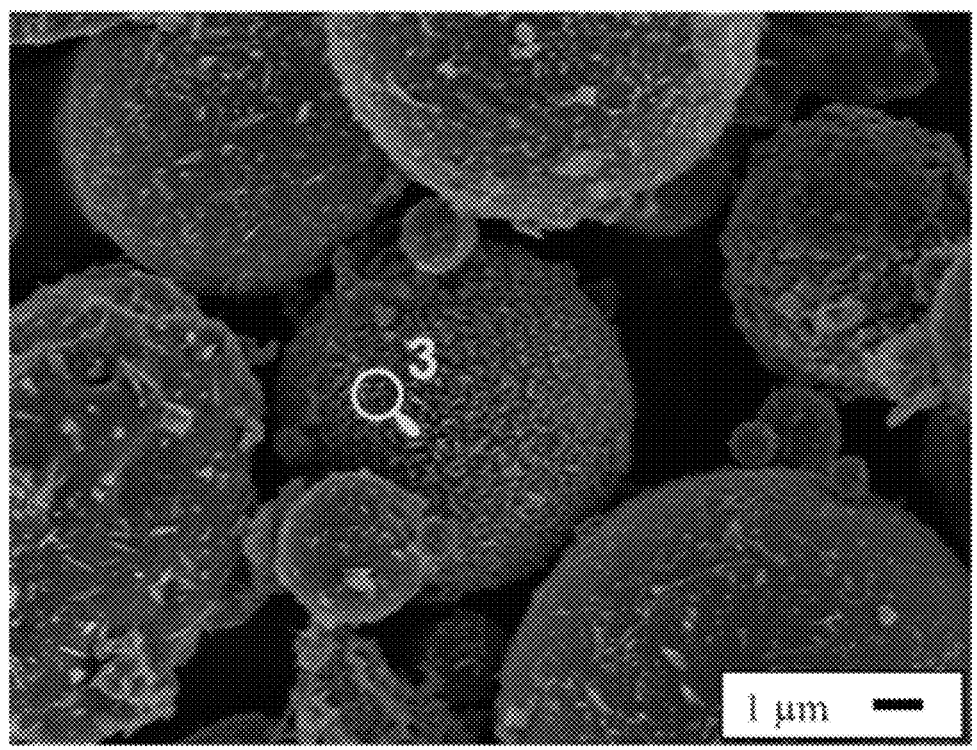
Figure 3D:
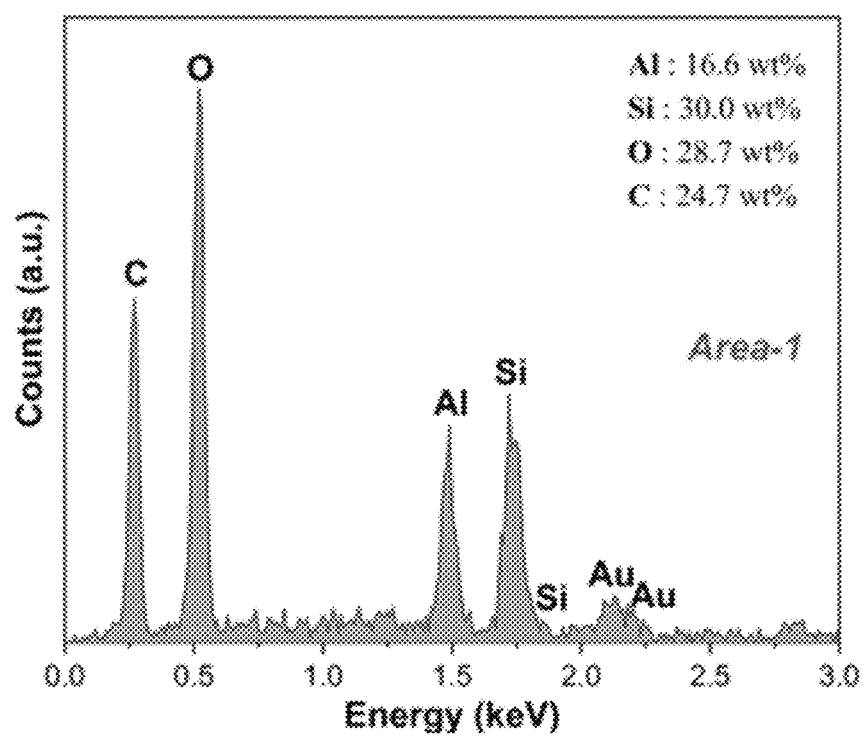
Figure 3E:
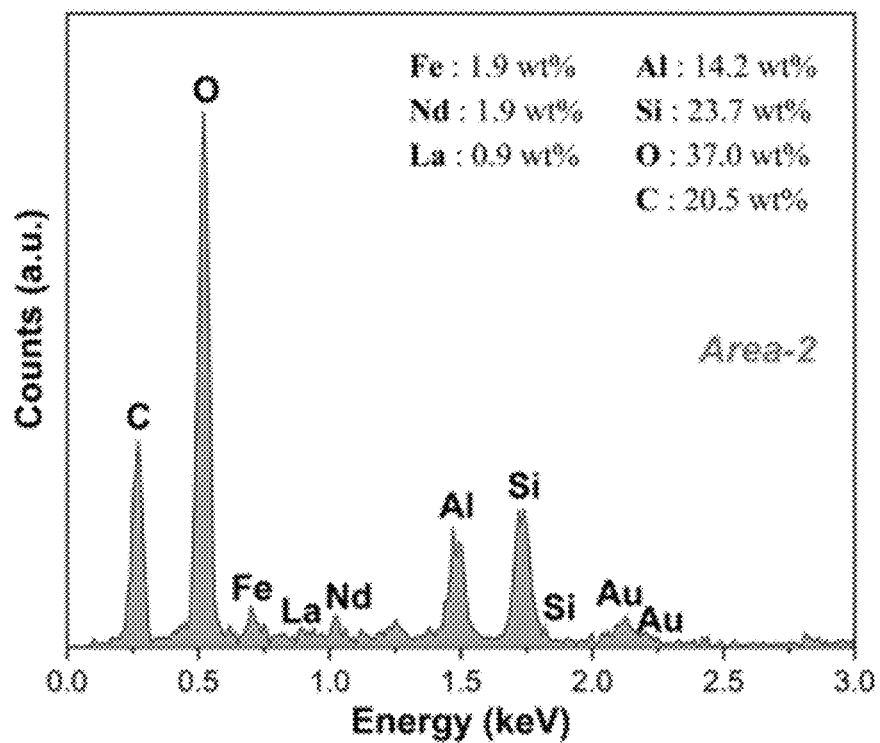
Figure 3F:
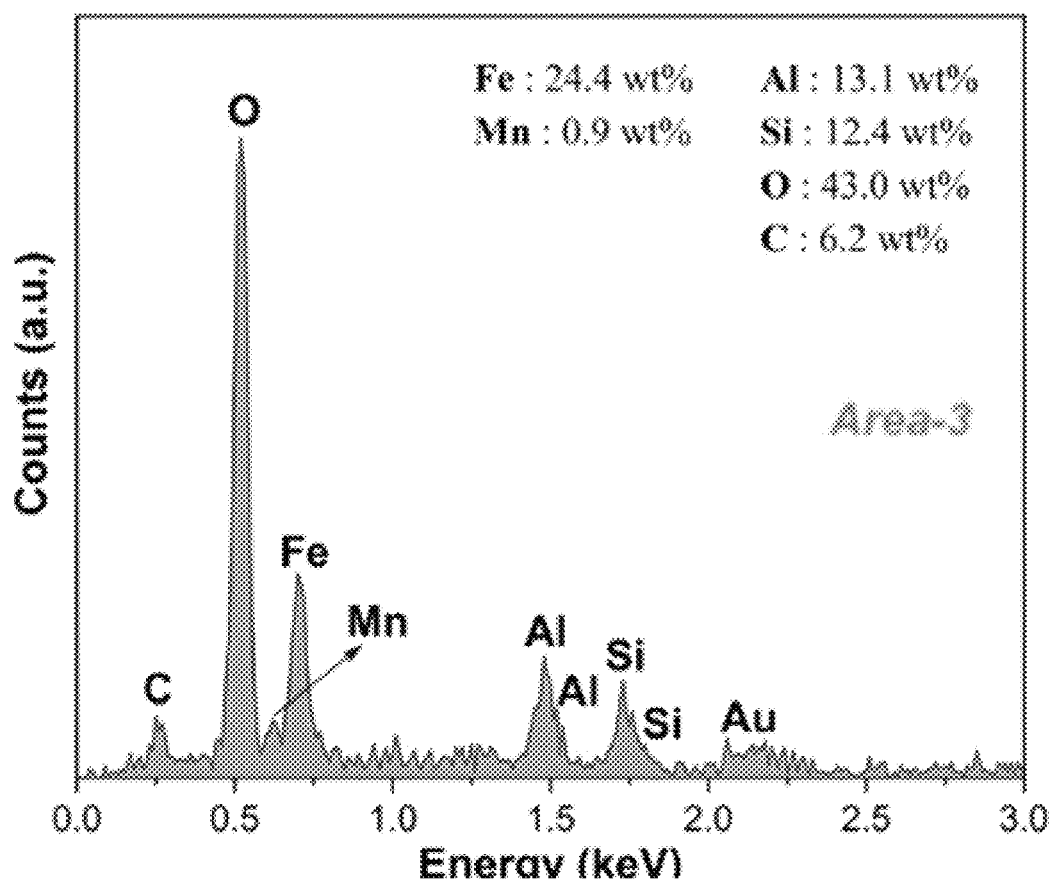
Figures 4A, 4B:
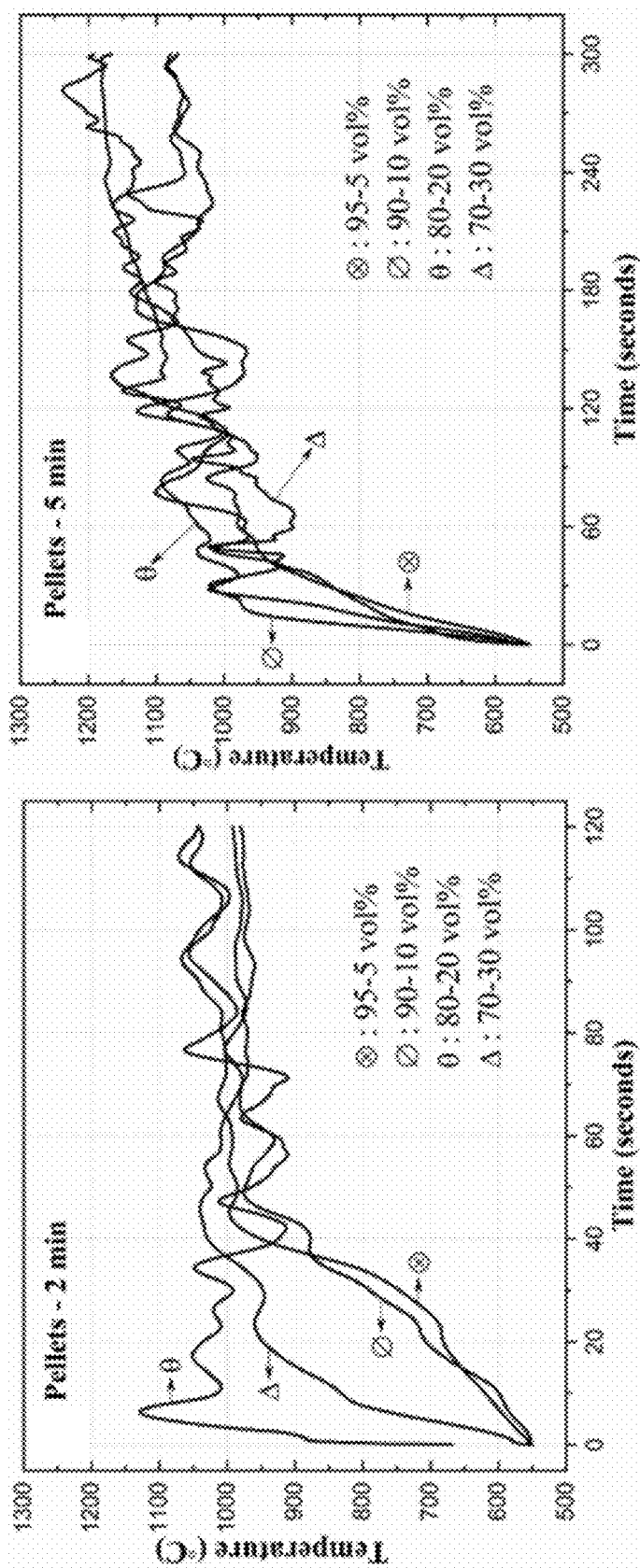
FIGS. 4A-4F show representative temperature-time profiles recorded for coal fly ash (CFA)-carbon mixtures as pellets and loose powders.
Figure 4D:
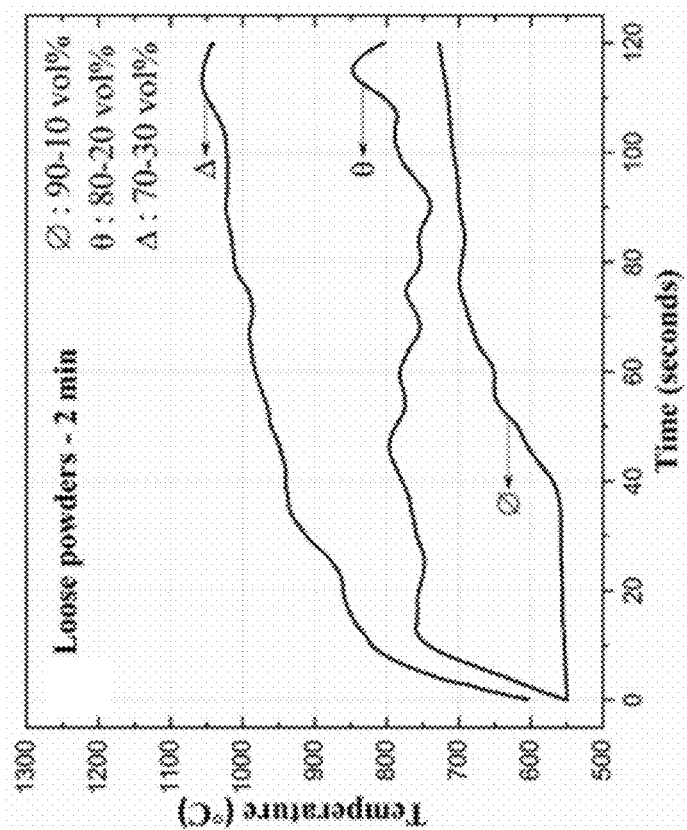
Figure 4C:
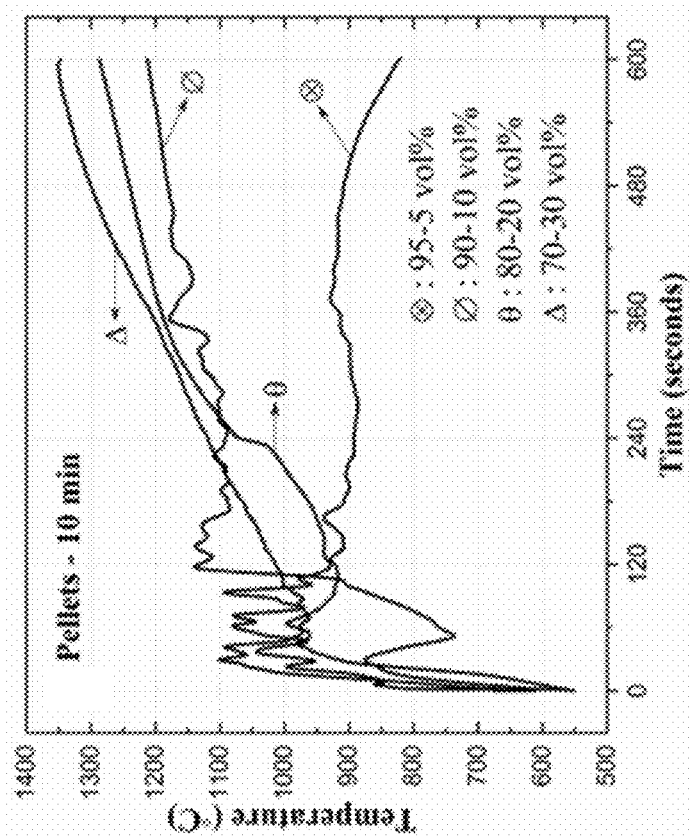
Figure 4F:
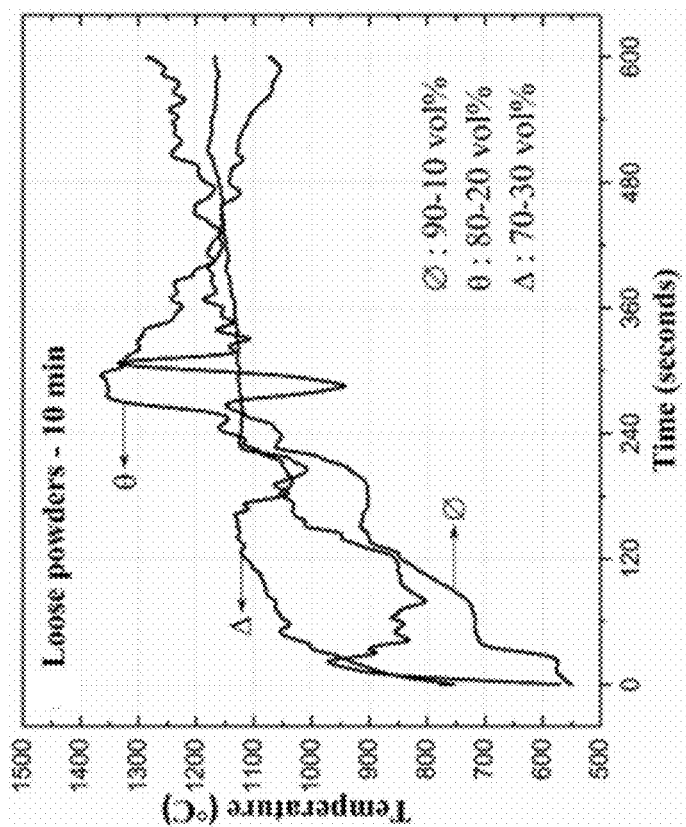
Figure 4E:
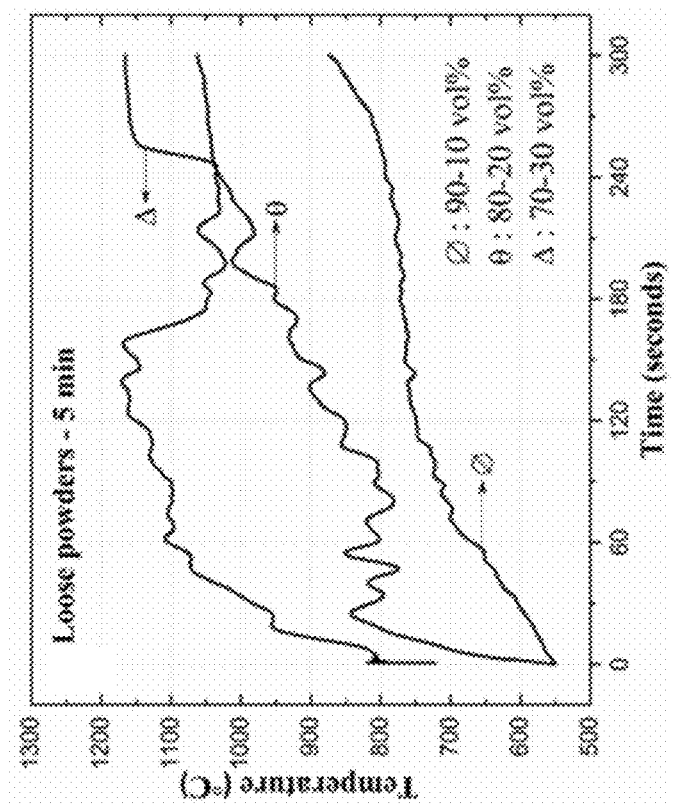
Figure 5B:
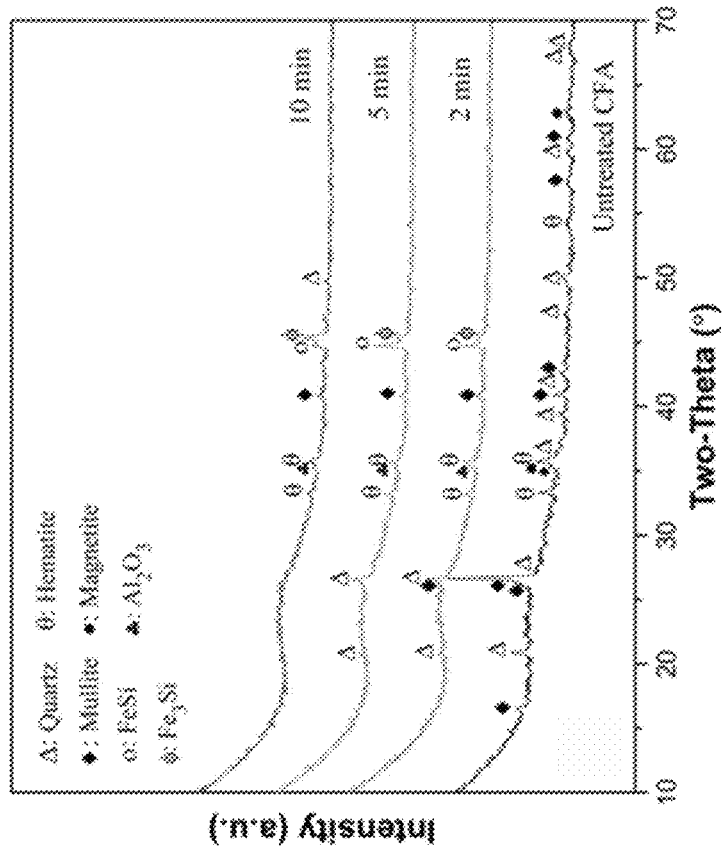
FIGS. 5A-5D show representative X-ray diffraction (XRD) pattern data obtained from untreated CFA and microwave-treated CFA-carbon pellet samples.
Figure 5A:
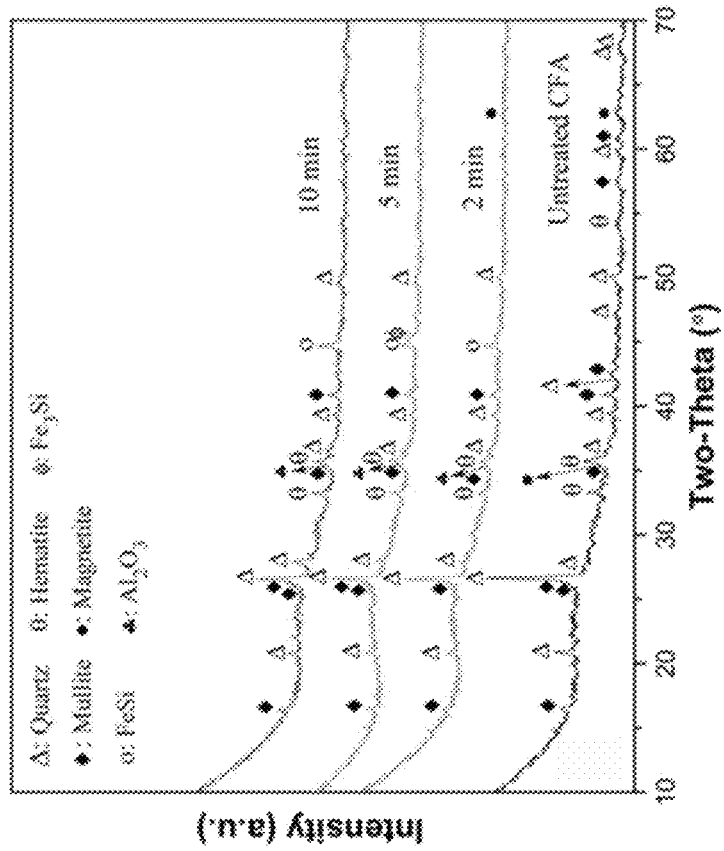
Figure 5D:
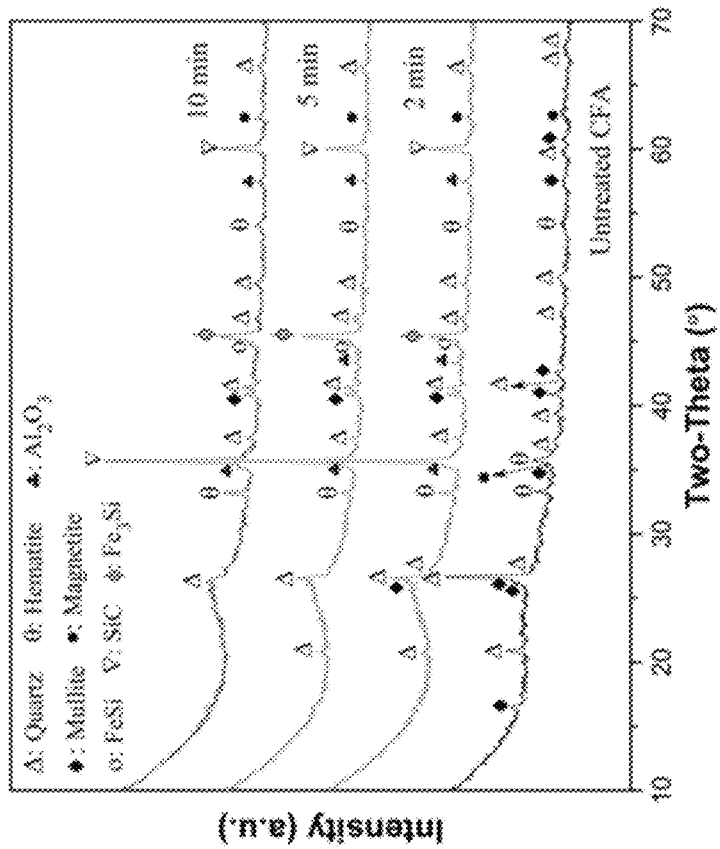
Figure 5C:
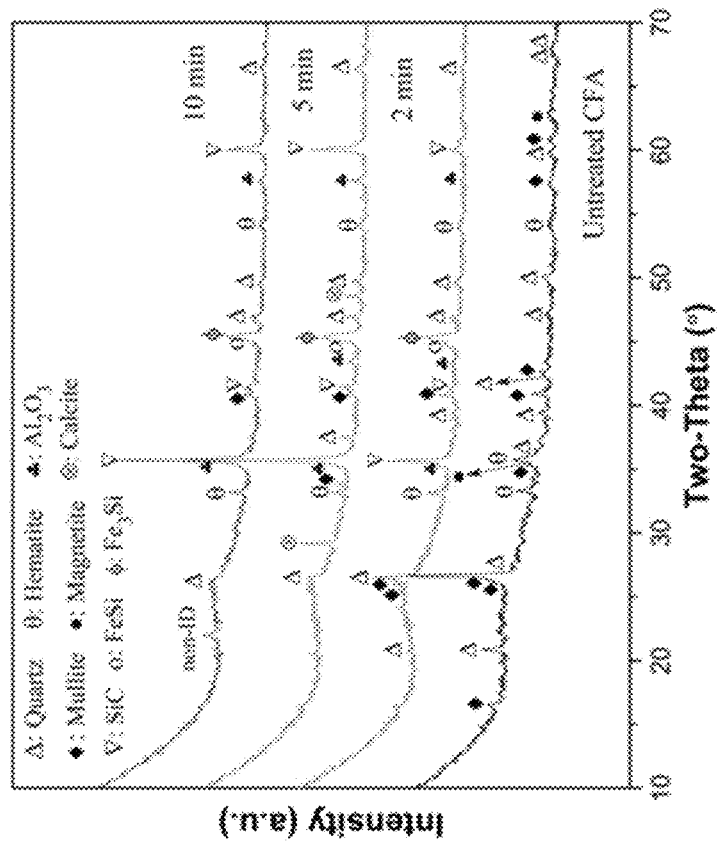

Elemental analysis of unleached CFA is presented in FIG. 2. The major light rare earth elements (LREEs) were cerium (Ce), lanthanum (La), and neodymium (Nd) (see panel (a) of FIG. 2). Other LREEs (scandium, praseodymium, samarium, gadolinium) were found to be in the range of 8.5-24 ppm. Yttrium (Y) was the most abundant heavy rare earth element (HREE) (see panel (b) of FIG. 2), with lower concentrations of dysprosium, erbium, and ytterbium. Lower concentrations were found for europium (Eu), holmium (Ho), terbium (Tb), thulium (Tm), and lutetium (Lu). Elemental analysis of starting CFA powder is summarized in Table 2 below.

TABLE 2

| Element | Concentration (ppm) |
|---|---|
| Ce | 116 |
| La | 56.3 |
| Nd | 51 |
| Sc | 8.5-24 |
| Pr | 8.5-24 |
| Sm | 8.5-24 |
| Gd | 8.5-24 |
| Y | 43.1 |
| Dy | 8.0 |
| Er | 4.5 |
| Yb | 4.3 |
| Eu | 0.7-2.2 |
| Ho | 0.7-2.2 |
| Tb | 0.7-2.2 |
| Tm | 0.7-2.2 |
| Lu | 0.7-2.2 |
| LREEs (total) | 281.5 |
| HREEs (total) | 64.4 |
| REEs (total) | 345.9 |
| Al | 118,000 |
| Fe | 96,100 |
| Ca | 36,300 |
| Mg | 7,660 |
| Mn | 368 |

The sample was generally found to be highly rich in Ce, La, Nd, Y, and Sc, with a total content of REEs similar to values reported for other CFA powders. Elemental analysis also revealed high concentrations of non-REE metals including aluminum, iron, calcium, magnesium, and manganese (see FIG. 2, panel (c)), similar to previously-reported CFA analyses; however, the CFA used in this study should be considered rich in iron oxide since the concentration of Fe was close to that of Al (see Table 2) and $Al_2O_3$ is one of the major constituents in CFA. Iron concentration is known to be directly related to the coal type and collection point of CFA during the combustion process.

Microstructural Analysis

SEM and EDS analyses were completed to study the morphology and elemental composition of the starting CFA. FIG. 3 shows the SEM microstructures and EDS spectra of the starting CFA powder. The results showed that the CFA particles were predominantly spherical in morphology with minor irregularly-shaped content. The average size of these spheres ranged from 1 to 60 μm, indicating their broad particle size distribution similar to the particle size analysis conducted via laser diffraction. In addition to these spheres (gray particles), irregularly-shaped flakes and particles (brighter areas) were observed on the surfaces (FIG. 3, panels (b) and (c)), which implied the potential presence of iron oxide and other metal and rare earth oxides on the outer surface of the spheres. In order to understand the elemental distribution, EDS results recorded from three different areas (shown in FIG. 3, panels (b) and (c)) are also presented (see FIG. 3, panels (d), (e), and (f)). The EDS spectrum from the area marked 1 revealed the presence of four major elements (Al, Si, O, C) for spheres. This implied that the starting CFA was mainly composed of an aluminosilicate glass phase similar to what has been previously reported. The formation of these spherical particles with highly smooth surfaces is can be due to rapid cooling during fluidization after combustion, while the detected carbon indicated the existence of an unburned carbon phase in the starting CFA particles. The irregularly-shaped particles can contain unburned porous carbon and calcite. In a comparison of the EDS spectra collected from three different areas, the relative amounts of aluminum, silicon, and carbon varied, and also changed for different CFA materials due to differences in coal type and combustion conditions.

The EDS spectrum from the area marked 2 showed the limited amount of iron and rare earth elements (Nd, La) for the flake-type particles on the surface of aluminosilicate glass spheres. These results demonstrated that only limited concentrations of REEs are accessible for easy extraction via acid leaching. In addition to typical amorphous aluminosilicate spheres (gray particles) as presented in FIG. 3 (panels (a) and (b)), brighter spheres were also detected within the microstructure of the starting CFA (FIG. 3, panel (c)). As supported by the EDS analysis from the area marked 3, these particles were iron-rich spheres, which also consisted of an aluminosilicate phase and minor contents of unburned carbon and manganese. These results showed the necessity of breaking down the glass particles for enhanced extraction of REEs prior to any leaching process due to their limited content on the outer surfaces.

Example 5: Influence of Microwave Pretreatment Time and Carbon Content

Temperature Profiles and Heating Rates

Pellets prepared from CFA-carbon mixtures with compositions of 95-5, 90-10, 80-20, and 70-30 vol % were pretreated under 2 kW constant power microwave irradiation and continuous argon flow for 2, 5, or 10 min. Temperature-time profiles recorded during the microwave heating ramps for both pellet and loose powder-type samples are shown in FIG. 4 (see panels (a), (b), and (c)). For the pellet samples, the temperature rapidly increased to about 900-1050° C. in about 40 seconds regardless of carbon concentration. For microwave irradiation up to 2 min, all pellet samples displayed similar profiles after an initial heating ramp. After 5-10 min of microwave irradiation, pellets with high carbon content (20-30 vol %) showed relatively higher temperatures (above 1150-1200° C.) and heating rates compared to pellets with lower carbon content (5-10 vol %). In the pretreatment of 95-5 vol % pellets for 10 min, the temperature started to decrease from 997° C. to 822° C. after an initial heating period (60 s), implying a potential carbon loss or microstructural change.

Compared to the pellet samples, significant changes were observed on the temperature-time profiles for the loose powder samples (see FIG. 4, panels (d), (e), and (f)). Temperature profiles were not recorded for 95-5 vol % since the temperature never reached above 550° C. after microwave irradiation up to 10 min. Otherwise, temperature generally increased with increasing carbon content and pretreatment time. Temperature ranges after heating are presented in Table 3 below.

TABLE 3

| Sample Type | Heating Time (min) | Temperature or Range (° C.) |
| --- | --- | --- |
| Pellet (all) | 2 | 980-1043 |
| Pellet (all) | 5 | 1068-1192 |
| Pellet (all) | 10 | 822-1347 |
| Powder (90-10) | 2 | 720-800 |
| Powder (90-10) | 5 | — |
| Powder (90-10) | 10 | — |
| Powder (80-20) | 2 | 720-800 |
| Powder (80-20) | 5 | 1060-1280 |
| Powder (80-20) | 10 | 1060-1280 |
| Powder (70-30) | 2 | 1040 |
| Powder (70-30) | 5 | 1060-1280 |
| Powder (70-30) | 10 | 1060-1280 |

Heating rates were calculated for a 5 minute microwave irradiation and are presented in Table 4 below.

TABLE 4

| Sample Type | Composition | Heating Rate (° C./min) |
| --- | --- | --- |
| Pellet | 95-5 | 103.6 |
| Pellet | 90-10 | 105.6 |
| Pellet | 80-20 | 123.2 |
| Pellet | 70-30 | 128.4 |
| Powder | 90-10 | 64.6 |
| Powder | 80-20 | 102.3 |
| Powder | 70-30 | 123.0 |

Thus, a significant change in microwave irradiation and heating profile above a certain carbon content (i.e., >10 vol %) was observed. Except for the 70-30 vol % sample, powder heating rates were substantially lower compared to pellet samples. These results demonstrate a significant influence of carbon content and sample type on temperature-time profiles and heating rates.

Furthermore, significant temperature fluctuations were clearly observed for the pellets in the initial 2-4 min periods, which is directly related to microplasma formation and subsequent localized heating (or hotspots) and high heating rates. Fewer temperature fluctuations were detected in the loose powder samples. This indicates that particle-particle (CFA-carbon and carbon-carbon) interactions were higher in the pellets, which resulted in enhanced thermal energy transfer, localized heating, and more microplasma formation.

Compositional Changes

Compositional changes in the microwave-treated pellet samples were examined and compared to the phase analysis of the untreated CFA. FIG. 5 shows the XRD patterns of the untreated CFA (bottom pattern, each panel) and the evolution of XRD patterns of the CFA-carbon pellets as a function of composition and microwave pretreatment time. As a baseline, the major components of the untreated CFA were quartz ($SiO_2$), mullite ($3Al_2O_3.2SiO_2$), and hematite ($Fe_2O_3$). Magnetite ($Fe_3O_4$) was identified as the minor phase. Any unburned carbon in the CFA was not detected by XRD. Other minerals reported in the literature for CFA such as anorthite, calcite, and anhydrite were not detected in the present study. For the microwave-treated 95-5 vol % pellets (see FIG. 5, panel (a)), major peak intensities of quartz and hematite phases decreased as a function of microwave pretreatment time. In addition, alumina ($Al_2O_3$) and iron silicides (FeSi and $Fe_3Si$) were formed; it was evident that the formation of iron silicides increased relative to increasing pretreatment time. Similar results, but with more distinct changes, were observed for the microwave-treated 90-10 vol % pellets (see FIG. 5, panel (b)), with drastic increases in quartz, magnetite, hematite, and mullite peaks after microwave pretreatment. Quartz, magnetite, and mullite peaks almost completely disappeared after 10 min of microwave irradiation. The formation of alumina and iron silicides can similarly be seen; their content increased with increasing microwave pretreatment time.

With increasing carbon concentration to 20 or 30 vol %, significant compositional changes were detected due to the higher heating rates and local temperatures reached under microwave irradiation (see FIG. 5, panels (c) and (d)). Quartz and mullite phases gradually disappeared as a function of increasing pretreatment time, with quartz phases not being clearly visible after microwave irradiation for 10 min. After microwave pretreatment in the presence of high amounts of carbon, the SiC, $Al_2O_3$, and $Fe_3Si$ phases became the major crystalline phases, with their amounts increasing with increasing microwave pretreatment time. The presence of a calcite phase was detected only for the 80-20 vol % pellets after 5 min of microwave irradiation.

XRD analyses showed significant compositional changes within the structure of the CFA after microwave pretreatment of pellets for 2-10 min. Amounts of quartz, mullite, and hematite highly decreased with increasing carbon content and pretreatment time, indicating possible reactions occurring between the major components of CFA (silica, mullite, hematite) and carbon at high temperatures. Formation of alumina and iron silicides (FeSi, $Fe_3Si$) was observed for all samples. However, in the presence of high carbon content (20-30 vol %), silicon carbide, alumina, and iron silicide ($Fe_3Si$) were identified as the major crystalline phases after microwave irradiation. These results indicate that quartz and mullite reacted with carbon to form SiC, $Al_2O_3$, FeSi, and $Fe_3Si$ as a result of reduction reactions of mullite and silica phases in the presence of carbon, iron oxides, and reduced iron.

It has been previously reported that the reduction temperatures of mullite and quartz in CFA could be decreased to the range of 1351-1419 K (1078-1146° C.) with carbon and iron oxide ($Fe_2O_3$ and $Fe_3O_4$) additions. The temperatures during microwave pretreatment in the presence of low carbon (5-10 vol %) and high carbon (20-30 vol %) reached 1000-1210° C. and 1000-1350° C., respectively, and formation of iron silicides and alumina was observed for all microwave-treated samples due to reduction of mullite and quartz in the presence of carbon and pre-existing iron oxide phases in the CFA under argon flow. However, SiC formation was detected only when high carbon content was used, a result directly related to the higher temperatures and localized temperature zones reached during microwave irradiation.

Microstructural Changes

FIG. 6 shows SEM microstructures of 95-5 and 90-10 vol % CFA-carbon pellets after microwave irradiation for from 2-10 minutes. For the 95-5 vol % sample, no changes in particle morphology were observed during the first 2 min of microwave irradiation, and only limited pore formation was observed. When time increased to 5-10 min, large cracks and macropores formed on the surfaces of the glass spheres. The presence of a partially-broken particle was also evident after 5 min, and similar morphological changes (e.g., pores, hairline cracks) were observed for the 90-10 vol % sample, but their formation started during the initial 2 min of irradiation.

In addition, neck formation was detected between large class spheres after 10 min, which indicated the occurrence of initial stages of solid state sintering as temperatures reached nearly 1215° C. Thus, longer irradiation times and excessive carbon content may lower crack volume due to a sintering effect.

SEM microstructures of the 80-20 and 70-30 vol % CFA-carbon pellets after microwave irradiation for 2-10 min are presented in FIG. 7. The formation of cracks and pores on the surface of a large sphere by other smaller spheres is evident after 2 min irradiation of the 80-20 vol % pellets, implying rapid particle-particle interactions (e.g., CFA-CFA, CFA-carbon) induced by microwave heating and ultra-high heating rates (>123° C./min). A significant increase in crack and pore volume and size was also observed with increasing microwave pretreatment time. When carbon content increased to 30 vol %, large cracks and pores were similarly identified mostly after 5-10 min irradiation. In addition, different features (e.g., dendritic structures) were observed, due to higher carbon content and the resulting higher temperatures, reaching nearly 1350° C.

In summary, microwave-assisted pretreatment induced the formation of large cracks and macropores on the surfaces of CFA particles, changes which are highly beneficial for improving the extraction of REEs due to thermal expansion, phase transitions, and rapid particle-particle interactions induced by ultrahigh heating rates (104-128° C./min) as well as localized heating zones with temperatures reaching 820-1350° C. These results demonstrate that crack volume and size primarily increased with increasing irradiation time and carbon concentration. In addition, the formation of spherical particles observed in the presence of high carbon content may indicate the dewetting of certain metals from their oxide phases as a result of microwave-induced carbothermal reduction.

Example 6: Acid Leaching after Microwave Pretreatment

Microwave-treated CFA samples were leached using 1 M $HNO_3$ for 1 hour with a 3 g/100 mL solid liquid ratio at 85° C. and a stirring speed of 125 rpm to understand the influence of microwave-assisted pretreatment on the leaching efficiency of the REEs. Leaching experiments were also carried out using an untreated CFA sample as a control.

The concentrations of REEs given below were measured using inductively coupled plasma mass spectrometry (ICP-MS).

Figure 8A:
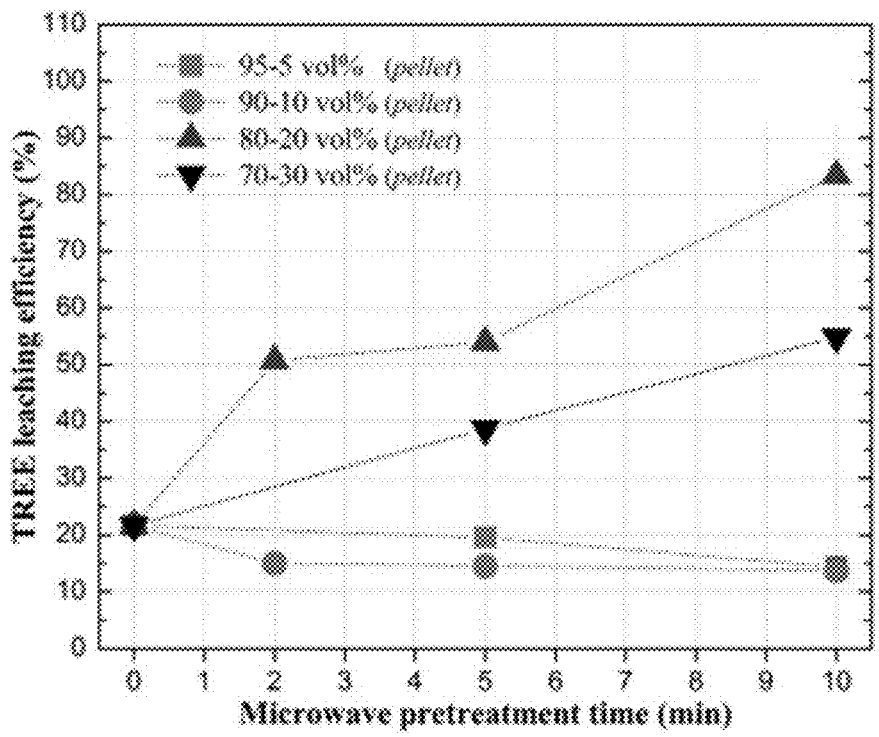
FIGS. 8A-8C shows representative leaching efficiency data from a 80-20 vol % pellet (vol % for CFA-carbon material, respectively) as a function of microwave pretreatment time.
Figure 8B:
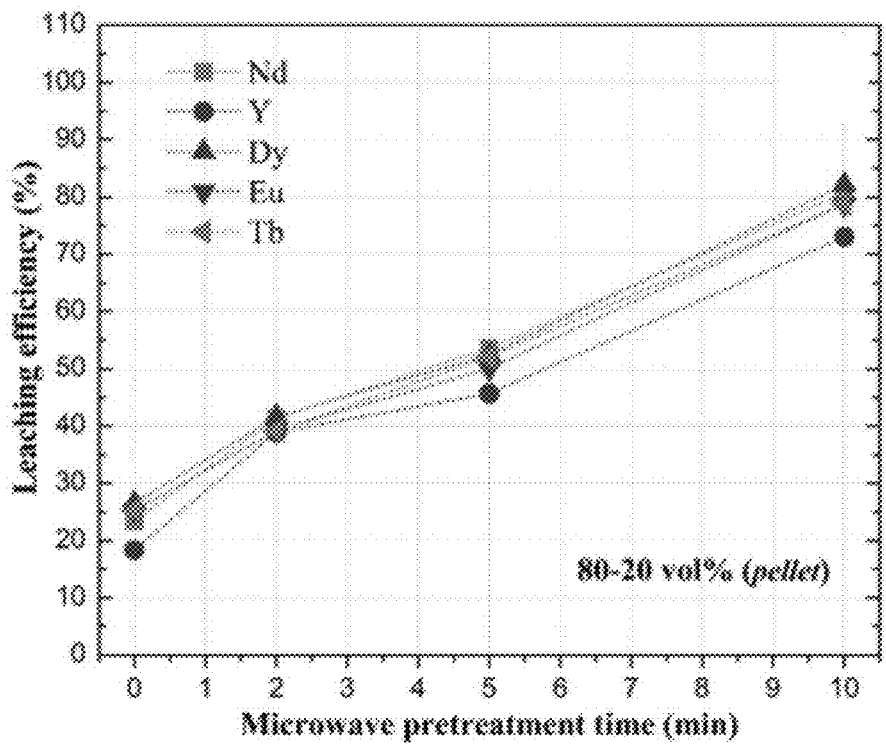
Figure 8C:
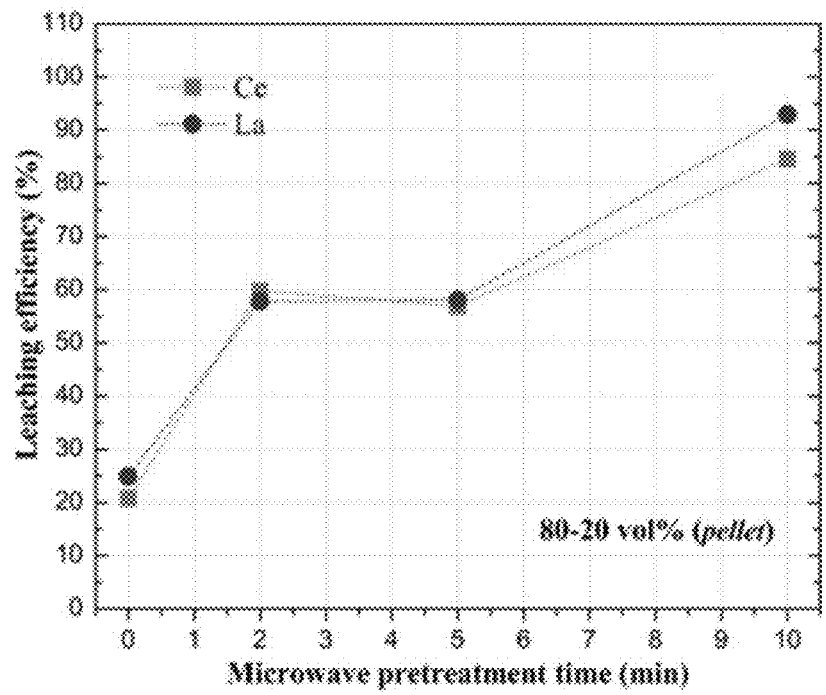

FIG. 8, panel (a) shows the leaching efficiency of total rare earth elements (TREEs) from untreated and microwave-treated pellet samples. The leaching efficiency of the TREEs from the untreated CFA control sample was 21.7% as indicated by the zero time starting point. Leaching efficiency decreased to 13.7-14.3% for the microwave-treated 95-5 and 90-10 vol % pellets as a function of pretreatment time. However, TREE leaching efficiency greatly increased to the range of 54.9-83.4% with increasing carbon concentration (20-30 vol %) and irradiation time. The 20 vol % carbon concentration resulted in the highest TREE leaching recovery, indicating an optimum amount for pretreatment.

Based on the results were achieved with the 80-20 vol % pellets, leaching efficiencies of the most critical REEs (Nd, Y, Dy, Eu, Tb) and other major REEs (Ce, La) are shown in FIG. 8, panels (b) and (c). The leaching efficiencies of the most critical REEs increased from 18-4-26.5% to 73.0-82.1% with increasing pretreatment time (FIG. 8, panel (b)). Higher leaching efficiencies for cerium and lanthanum (84.6-92.9%) were achieved after microwave pretreatment for 10 min. Their leaching efficiencies sharply increased during the initial stage (0-2 min) and the final stage (5-10 min) but almost no change was observed during the intermediate stage (2-5 min). These results show an increase in REE extraction of about 3-4 times (from about 150 to 295%) with non-aggressive acid leaching as compared to previously-known, non-microwave procedures.

Figure 9:
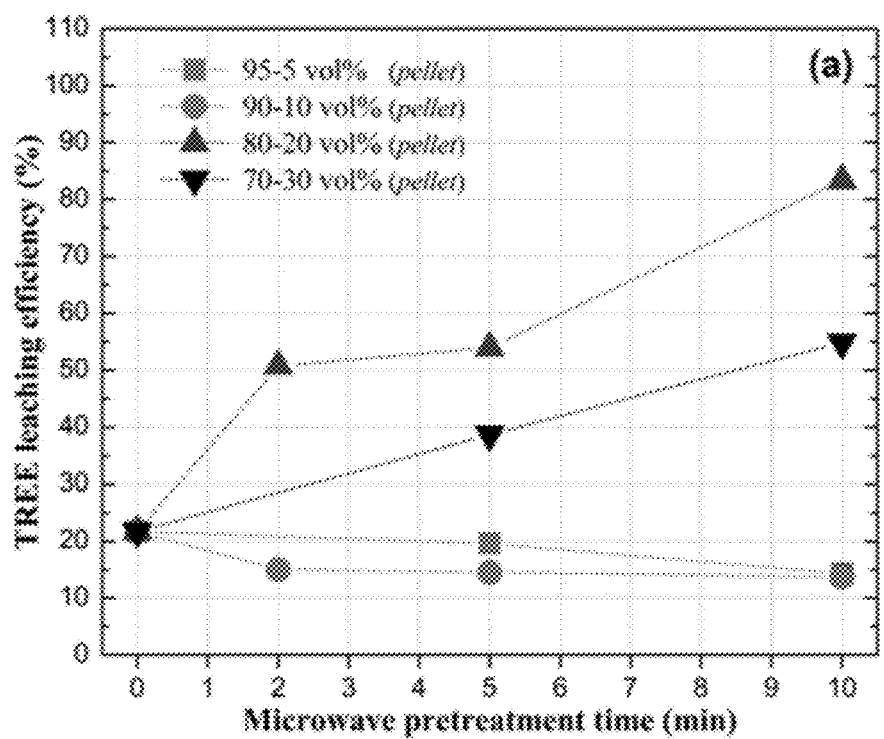
FIG. 9 shows a comparison of the leaching efficiencies of the total rare earth elements (TREEs) from the pellets and loose powders (80-20 and 70-30 vol %) as a function of microwave pretreatment time.

To understand the influence of sample type on leaching efficiency, similar experiments were carried out on selected microwave-treated loose powder samples with high carbon content (20-30 vol %). Leaching efficiencies of TREEs from the pellets and loose powders are compared in FIG. 9. For the 80-20 vol % composition, the TREE leaching efficiency of the pellets and loose powders increased to 83.4 and 50.1%, respectively. Thus, the leaching efficiency of TREEs for these pellets was 33.3% higher compared to loose powder forms. However, this trend was not observed for the 70-30 vol % samples, with TREE leaching efficiencies of 70-30 vol % pellets being only 2.7% higher than their loose powders after microwave irradiation for 10 min.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for beneficiating coal ash particles, the method comprising:
   a. providing coal ash particles comprising coal fly ash (CFA);
   b. providing a carbon source;
   c. thoroughly mixing the coal ash particles and carbon source to create a first mixture;
   d. transferring the first mixture to a heating vessel;
   e. placing the heating vessel in a microwave cavity; and
   f. microwave processing comprising heating the first mixture with microwave irradiation to generate processed coal ash particles;
   wherein the method creates defects in the processed coal ash particles;
   wherein the processed coal ash particles comprise a three-dimensional network between the CFA particles and carbon, thereby providing a rapid transfer of thermal energy from carbon to CFA particles;
   wherein the carbon source comprises carbon black, carbon lampblack, activated carbon, 50% compressed carbon acetylene black, 90% compressed carbon acetylene black, 100% compressed carbon acetylene black, charcoal, coal, or a combination thereof; and
   wherein the microwave processing is conducted under a gas flow.

2. The method of claim 1, wherein the carbon source comprises carbon lampblack.

3. The method of claim 1, wherein the coal ash particles and the carbon source are present in a ratio of from 95:5 vol % to 70:30 vol %.

4. The method of claim 1, wherein in step (c), mixing is accomplished by dry roll milling.

5. The method of claim 1 further comprising pressing the first mixture into a pellet as a step between steps (c) and (d).

6. The method of claim 5, wherein the pellet has a diameter of from 13 to 26 mm and a thickness of from 5 to 20 mm.

7. The method of claim 5, wherein the pressing into a pellet is pressing using a steel die; and wherein 13 to 14 MPa of uniaxial pressure is applied to the steel die to create the pellet.

8. The method of claim 7, wherein a lubricant is applied to the steel die prior to adding the first mixture to the steel die.

9. The method of claim 1, wherein the heating vessel is a crucible, and wherein the crucible comprises alumina.

10. The method of claim 1, wherein microwave processing of the first mixture results in heating of the first mixture to a temperature of from 1000° C. to 1350° C.

11. The method of claim 1, wherein microwave processing of the first mixture is conducted under an inert gas flow.

12. The method of claim 1, wherein the carbon source comprises carbon lampblack, wherein the coal ash particles and the carbon source are present in a ratio of 80:20 vol %, and wherein microwave processing is conducted for a period of 10 minutes.

13. The method of claim 1, wherein the coal ash particles consist essentially of coal fly ash particles.

14. A method for hydrometallurgical recovery of rare earth elements from the processed coal ash particles of claim 1, the method comprising performing an acid leaching step on the processed coal particles, thereby recovering the rare earth elements from the processed coal ash particles.

15. The method of claim 14, wherein acid leaching is performed with an aqueous solution comprising nitric acid, hydrochloric acid, sulfuric acid, hydrofluoric acid, or a combination thereof.

16. The method of claim 15, wherein the nitric acid has a concentration of 1 M in the aqueous solution.

17. he method of claim 14, wherein acid leaching is conducted with heating to a temperature of from 50° C. to 90° C.

18. The method of claim 14, wherein the method results in recovery of at least 70% of the rare earth elements originally present in the processed coal ash particles.

19. The method of claim 14, wherein the processed coal ash particles are prepared from coal fly ash particles.

* * * * *